(12) United States Patent
Ishii et al.

(10) Patent No.: US 7,867,132 B2
(45) Date of Patent: Jan. 11, 2011

(54) GEAR TRANSMISSION

(75) Inventors: Norihiro Ishii, Amagasaki (JP);
Tomoyuki Ebihara, Amagasaki (JP);
Hiroshi Tottori, Amagasaki (JP);
Kazunari Koga, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 484 days.

(21) Appl. No.: 12/051,922

(22) Filed: Mar. 20, 2008

(65) Prior Publication Data
US 2008/0234092 A1 Sep. 25, 2008

(30) Foreign Application Priority Data
Mar. 20, 2007 (JP) .............................. 2007-073687

(51) Int. Cl.
*F16H 3/44* (2006.01)
(52) U.S. Cl. ........................................ 475/293; 475/296
(58) Field of Classification Search ......... 475/275–278, 475/284, 293, 294, 296
See application file for complete search history.

(56) References Cited

U.S. PATENT DOCUMENTS

| | | | | |
|---|---|---|---|---|
| 7,455,145 B2* | 11/2008 | Irikura et al. | ............... | 180/242 |
| 2008/0214351 A1* | 9/2008 | Katayama et al. | ........... | 475/296 |
| 2009/0047151 A1* | 2/2009 | Irikura et al. | ............... | 417/405 |
| 2009/0280944 A1* | 11/2009 | Hiraoka et al. | .............. | 475/116 |

FOREIGN PATENT DOCUMENTS

JP   2003-194097   7/2003

OTHER PUBLICATIONS

Patent Abstracts of Japan, abstract of Publication No. JP 2003-194097, Gear Fall Preventing Mechanism for Transmission, (listed on accompanying PTO/SB/08A as document FP1).

* cited by examiner

*Primary Examiner*—Ha D. Ho
(74) *Attorney, Agent, or Firm*—Sterne, Kessler, Goldstein & Fox P.L.L.C.

(57) ABSTRACT

A gear transmission comprises a traveling load detection element including an upstream detection member, a downstream detection member and a biasing member. One of the upstream and downstream detection members is an axially slidable detection member which is axially slidable along an output shaft. One of the upstream and downstream detection members has a first engagement part and a second engagement part. The first engagement part and the second engagement part generate respective forces for sliding the axially slidable detection member opposite to the biasing direction of the biasing member. The forces are changed according to variation of the traveling load.

15 Claims, 24 Drawing Sheets

GEAR TRANSMISSION

BACKGROUND OF THE INVENTION

1. Field of the Invention

The present invention relates to a gear transmission including high and low speed gear trains one of which is selected. Especially, the gear transmission is provided in an axle drive unit equipped on a utility vehicle under a cargo deck of the utility vehicle.

2. Related Art

As disclosed in JP 2003-194097 A, there is a well-known axle drive unit which includes a gear transmission serving as a sub transmission connected to an output side of a belt type stepless transmission serving as a main transmission, and includes an axle driven by the gear transmission.

However, since the speed change operation of the sub transmission is manual, an operator must take the trouble to stop the vehicle for the sub speed change operation. Even if a load applied on the traveling vehicle, i.e., a load applied on (or a resistance against) the output shaft during traveling of the vehicle (hereinafter, referred to as "traveling load") changes, the operator cannot operate the sub transmission so as to make the activated speed gear train of the sub transmission correspond to the real traveling load during traveling of the vehicle.

Further, an operator may wrongly select one of speed stages of the sub transmission, so that, during traveling of the vehicle, the wrongly selected speed stage may be incongruous to the rotary speed of the axle or of a prime mover so as to reduce the transmission efficiency or the insufficiency of torque, thereby causing an engine failure or other problems.

SUMMARY OF THE INVENTION

An object of the present invention is to provide a gear transmission including a high speed gear train and a low speed gear train, wherein the gear transmission can automatically speed-change in correspondence to load applied on the traveling vehicle, i.e., load applied on the output shaft during traveling of the vehicle (hereinafter, referred to as "traveling load").

To achieve the object, according to the present invention, a gear transmission for driving an axle of a vehicle comprises an input shaft, an output shaft for driving the axle, a high speed clutch, a high speed gear train interposed through the high speed clutch between the input shaft and the output shaft, a low speed clutch, a low speed gear train interposed through the low speed clutch between the input shaft and the output shaft, and a traveling load detection means. The traveling load detection means detects a traveling load that is a load applied on the output shaft during traveling of the vehicle. The traveling load detection means includes an upstream detection member, a downstream detection member and a biasing member. The upstream detection member is provided relatively rotatably on the output shaft so as to be drivingly connected to the input shaft through either the high speed gear train or the low speed gear train and either the correspondingly engaged high speed clutch or low speed clutch. The downstream detection member is provided relatively unrotatably on the output shaft. One of the upstream and downstream detection members is an axially slidable detection member which is axially slidable along the output shaft. The biasing member biases the upstream detection member and the downstream detection member toward each other. One of the upstream and downstream detection members has a first engagement part and a second engagement part. When the axially slidable detection member slides in the biasing direction of the biasing member, the first engagement part is engaged with the other of the upstream and downstream detection members. When the axially slidable detection member slides opposite to the biasing direction of the biasing member, the second engagement part is engaged with the other of the upstream and downstream detection members. The first engagement part and the second engagement part generate respective forces for sliding the axially slidable detection member opposite to the biasing direction of the biasing member. The forces are changed according to variation of the traveling load. When the traveling load is increased and becomes larger than a first switching point, the axially slidable detection member slides away from the other upstream or downstream detection member opposite to the biasing direction of the biasing member, so that the high speed clutch is disengaged and the low speed clutch is engaged. When the traveling load is reduced and becomes smaller than a second switching point which is smaller than the first switching point, the axially slidable detection member slides toward the other upstream or downstream detection member in the biasing direction of the biasing member, so that the high speed clutch is engaged and the low speed clutch is disengaged.

Due to the gear transmission according to the present invention, as far as the variation of traveling load is within the range between the first and second switching points, the set high or low speed stage is maintained, thereby preventing frequent gearshift between the high speed stage and the low speed stage, and thereby stabilizing the traveling of the vehicle. Namely, the second switching point for switching the activated speed gear train from the low speed gear train to the high speed gear train is lower than the first switching point for switching the activated speed gear train from the high speed gear train to the low speed gear train, and the difference of the traveling load between the first and second switching points is hysteresis. Therefore, once the increasing traveling load becomes larger than the first switching point and the high speed gear train is switched to the low speed gear train, the activation of the low speed gear train is kept while the traveling load is larger than the second switching point which is lower than the first switching point even if the traveling load is reduced.

Preferably, an actuator for switching the high speed clutch is electrically controlled, and is provided with an electric switch which is turned on and off due to the slide of the axially slidable detection member.

Further preferably, the high speed clutch is a hydraulic clutch.

Therefore, no complicated mechanical structure is required for controlling the high speed clutch such as the hydraulic clutch, thereby minimizing the gear transmission.

Alternatively, the high speed clutch is mechanically connected to the axially slidable detection member.

Therefore, it is not necessary to provide any additional control means for controlling the forward high speed clutch.

In addition to the mechanical connection of the high speed clutch to the axial slidable detection member, preferably, the high speed clutch is provided coaxially to the traveling load detection means.

Therefore, the gear transmission can be radially minimized.

Alternatively, in addition to the mechanical connection of the high speed clutch to the axial slidable detection member, preferably, the high speed clutch is provided non-coaxially to the traveling load detection means.

Therefore, the gear transmission can be axially minimized.

In addition to the mechanical connection of the high speed clutch to the axial slidable detection member, preferably, the high speed clutch is a dog clutch.

Therefore, the axial slidable detection member can be simply formed so as to correspond to the dog clutch serving as the high speed clutch, and can be simply disposed coaxially to the high speed clutch, thereby simplifying and radially minimizing the gear transmission.

Alternatively, in addition to the mechanical connection of the high speed clutch to the axial slidable detection member, preferably, the high speed clutch is a lever-actuated friction plate clutch.

Therefore, an actuator for operating the high speed clutch is a mechanical lever, thereby needing neither hydraulic pressure nor an electric switch.

Preferably, the low speed clutch is an overrunning clutch.

Therefore, the low speed clutch is naturally engaged according to a rotary speed reduction caused by the disengagement of the high speed clutch, and is naturally disengaged according to a rotary speed increase caused by the engagement of the high speed clutch.

Preferably, each of the upstream and downstream detection members is provided with the first engagement part and the second engagement part. The first and second engagements parts are surfaces continuous to each other. An angle of the first engagement part about the axis of the output shaft is different from an angle of the second engagement part about the axis of the output shaft.

Therefore, the above-mentioned hysteresis can be generated only by forming surfaces corresponding to the first engagement part and the second engagement part on each of the upstream and downstream detection members, thereby requiring no additional member for ensuring the hysteresis and thereby minimizing the gear transmission.

Preferably, the upstream detection member and the downstream detection member are engaged with each other through an intermediate member.

Further preferably, the intermediate member is shaped in a ball.

Therefore, such a simply shaped intermediate member can be used for generating the above-mentioned hysteresis, thereby reducing costs.

Preferably, the downstream detection member serves as the axially slidable detection member. The intermediate member is rotatably and slidably integral with the axially slidable downstream detection member. The upstream detection member serves as a low speed gear belonging to the low speed gear train, and the first engagement part and the second engagement part are formed in the low speed gear.

Therefore, the low speed gear of the low speed gear train also serves as the upstream detection member of the traveling load detection means so that the part number is reduced, the compactness is secured, and the cost is reduced.

Further preferably, a high speed gear belonging to the high speed gear train is disposed on the output shaft opposite to the axially slidable downstream detection member about the low speed gear. The high speed clutch includes an engagement member provided in the axially slidable downstream detection member. The engagement member slidably penetrates the low speed gear so as to be selectively engaged or disengaged with and from the high speed gear.

Therefore, the engagement member constituting the high speed clutch is disposed in the low speed gear juxtaposed to the high speed gear so as to secure the compactness in the axial direction.

Preferably, the gear transmission is a sub transmission disposed on the downstream of a main transmission so that the main transmission drives the input shaft of the gear transmission.

Therefore, the gear transmission serving as the sub transmission, whose conventional type has been only operated for changing its sub speed stage during the stationary state of the vehicle, can automatically speed-change the sub speed stage during traveling of the vehicle in correspondence to variation of traveling load.

These and other objects, features and advantages will appear more fully in the following detailed description with reference to accompanied drawings.

DETAILED DESCRIPTION OF THE INVENTION

Figure 1:
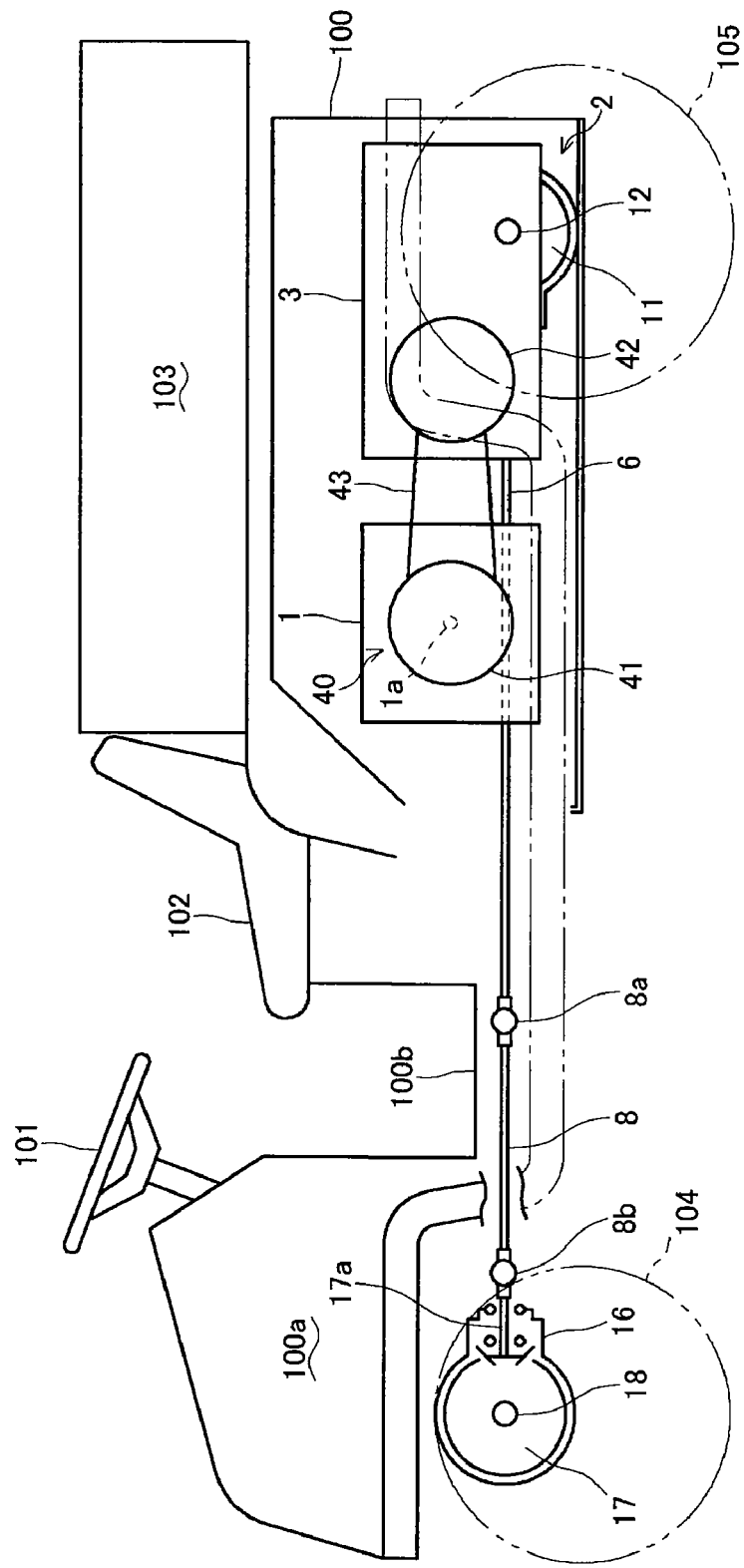
FIG. 1 is a side view of a utility vehicle equipped with an axle drive unit.

Explanation will be given on a working vehicle (utility vehicle) having an axle drive unit according to a first embodiment of the present invention. As shown in FIG. 1, in the utility vehicle, a platform 100*b* is disposed on a body frame 100, and a front cover 100*a* is disposed in front of the platform 100*b*. A driver's seat 102 is mounted on a front portion of a rear rising part of the body frame 100 behind the platform 100b, and a cargo deck 103 is disposed behind the seat 102. A pair of left and right front wheels 104 are suspended by left and right front portions of the body frame 100, and a pair of left and right rear wheels 105 are suspended by left and right rear portions of the body frame 100. A steering wheel 101 for steering the front wheels 104 is disposed on an upper portion of the front cover 100a.

An engine 1 is disposed on the body frame 100 below the cargo deck 103. The engine 1 is supported through vibration isolating rubbers (or is mounted vibration-isolatingly) on the body frame 100. An output shaft 1a is horizontally projected from the engine 1 and is connected to a belt type automatic continuously variable transmission (hereinafter, referred to as "CVT") 40 disposed on a lateral side of the engine 1. An axle drive unit 2 is disposed behind the engine 1 and on a lateral side of the CVT 40.

Figure 2:
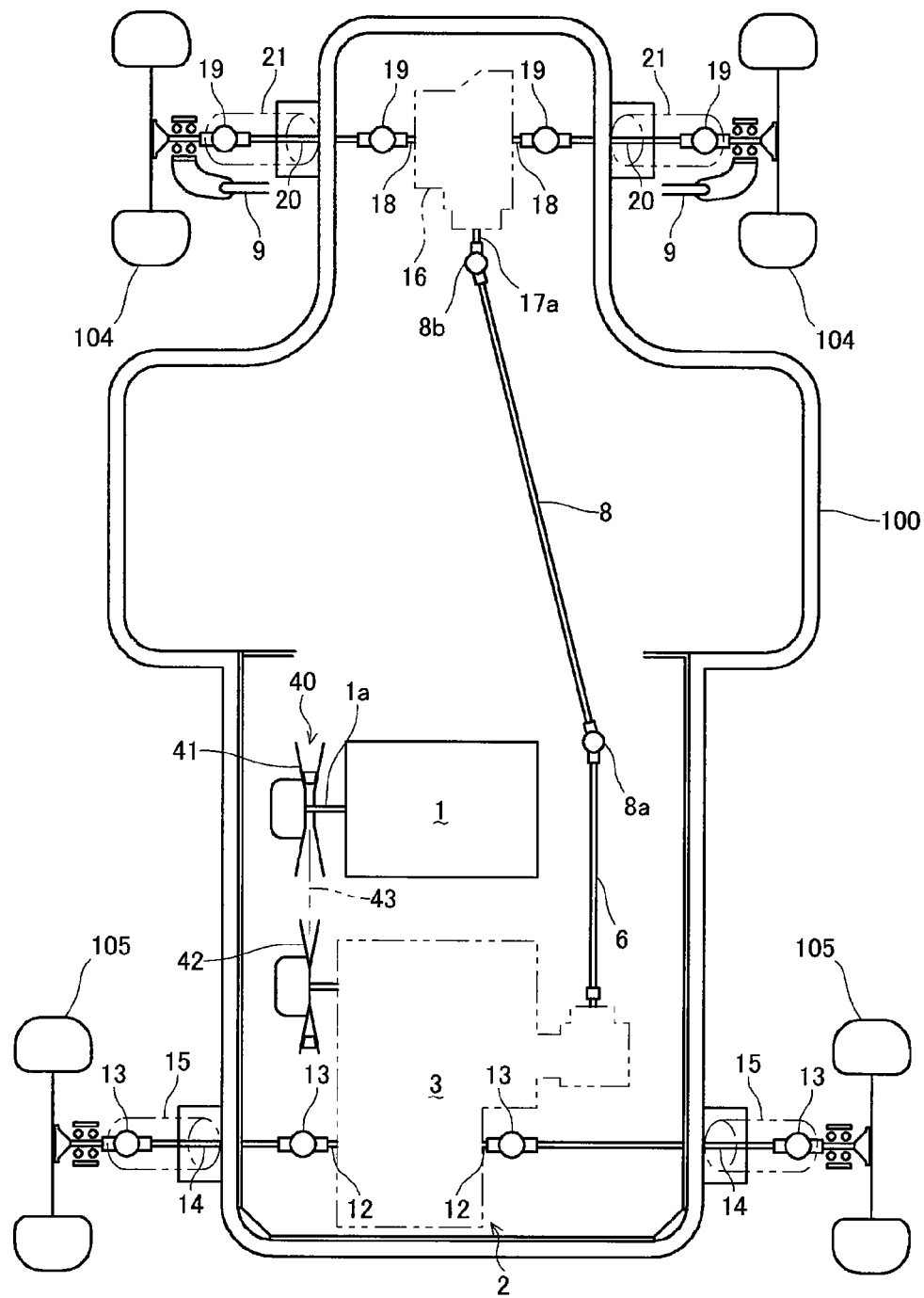
FIG. 2 is a plan view of the utility vehicle.
Figure 3:
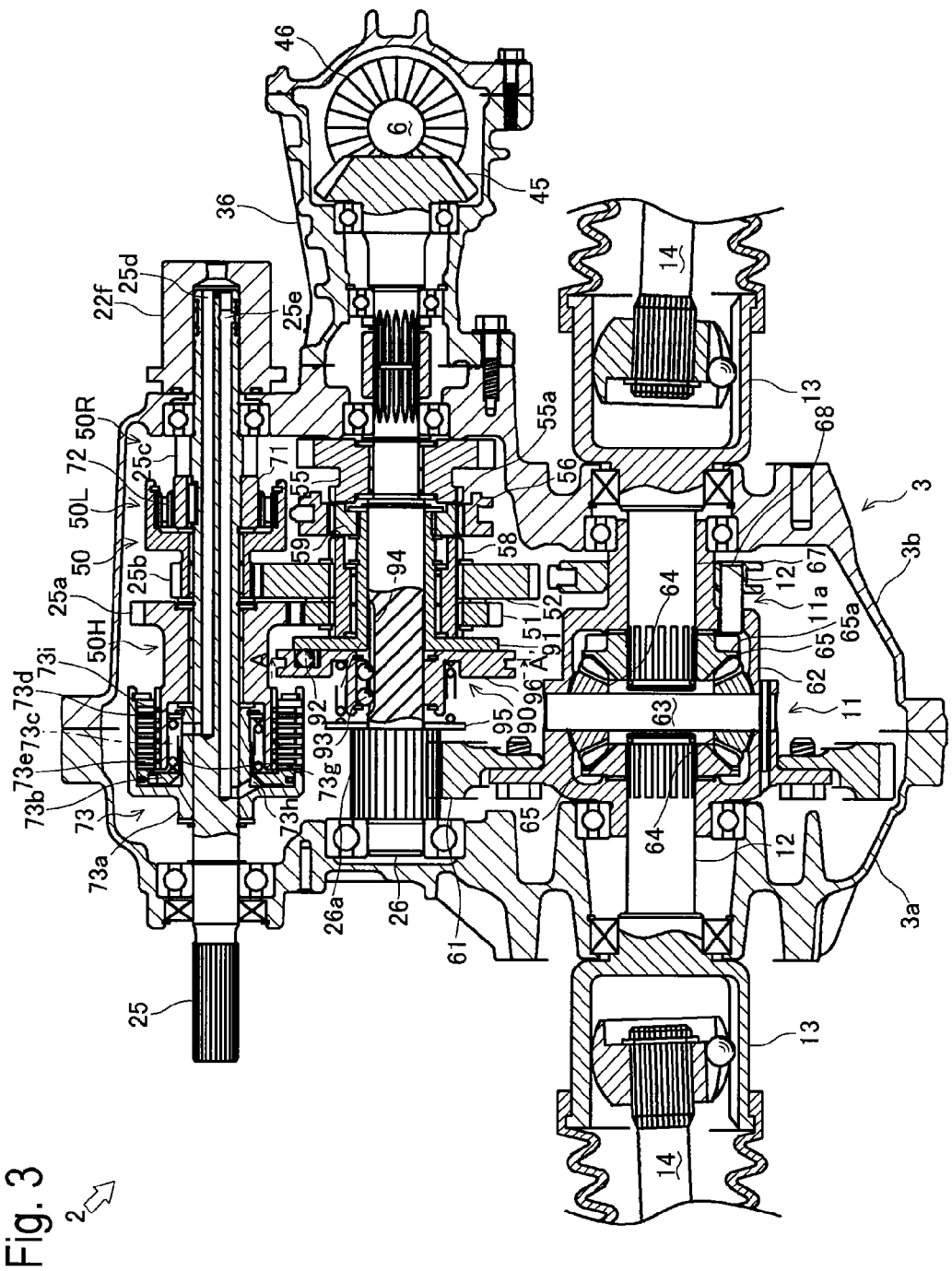
FIG. 3 is a sectional rear view of an axle drive unit of a first embodiment.

As shown in FIGS. 2 and 3, the axle drive unit 2 includes a transmission casing 3, a gear transmission 50 serving as a sub transmission, and a pair of left and right rear axles 12. In the transmission casing 3, the gear transmission 50 is housed and the rear axles 12 are journalled.

Similarly to the engine 1, the transmission casing 3 is supported through vibration isolating rubbers (or is mounted vibration-isolatingly) on the body frame 100. An output shaft 6 is projected horizontally forward from the transmission casing 3.

In the rear portion of the transmission casing 3, the pair of left and right rear axles 12 is supported, and a differential gear mechanism 11 is housed so as to differentially connect the rear axles 12 to each other. The rear wheel 105 is connected to each of the rear axles 12 through universal joints 13 and a propeller shaft 14, and is supported elastically by a suspension 15.

A front axle housing 16 is supported below the front cover 100a at the front portion of the body frame 100. In the front axle housing 16, a pair of left and right front axles 18 are supported, and a differential gear mechanism 17 is housed so as to connect differentially the front axles 18 to each other. The front wheel 104 is connected to each of the front axles 18 through universal joints 19 and a propeller shaft 20, and the front wheel 104 is supported elastically by a suspension 21. The front axles 18 are connected to each other by a tie rod 9, and the tie rod 9 is connected to the steering wheel 101. Accordingly, by rotating the steering wheel 101, the front axles 18 are turned leftward or rightward via the tie rod 9 so as to steer the utility vehicle. An input shaft 17a of the differential gear mechanism 17 is projected horizontally rearward from the rear portion of the front axle housing 16. The input shaft 17a is connected to the output shaft 6 projected from the transmission casing 3 through universal joints 8a and 8b and a propeller shaft 8.

Accordingly, the rotary power of the output shaft 1a of the engine 1 is transmitted and speed-changed through CVT 40 serving as the main transmission to the gear transmission 50 serving as the sub transmission. The power of the gear transmission 50 is transmitted to each of the rear wheels 105 through the differential gear mechanism 11, the rear axle 12, the universal joint 13, the propeller shaft 14 and the universal joint 13.

The power of the gear transmission 50 is transmitted to the differential gear mechanism 17 through the output shaft 6, the universal joint 8a, the propeller shaft 8, the universal joint 8b and the input shaft 17a. The power of the differential gear mechanism 17 is transmitted to each of the front wheels 104 through the front axle 18, the universal joint 19, the transmission shaft 20 and the universal joint 19.

The CVT 40 includes an input pulley 41 fixed on the output shaft 1a of the engine 1, an output pulley 42 fixed on a speed-change driving shaft 25 of the gear transmission 50, and a V-belt 43 wound around the input pulley 41 and the output pulley 42. The input pulley 41 is a split pulley and the width of a groove of the input pulley 41 into which the V-belt 43 is fitted is changed in correspondence to the rotary speed of the engine 1 (the output shaft 1a). By changing the width of the groove of the input pulley 41, the V-belt 43 is moved between the output shaft 1a and the speed-change driving shaft 25 so as to change the gear ratio between the input pulley 41 and the output pulley 42. For example, as lower the rotary speed of the engine 1 is, as wider the groove width of the input pulley 41 is, whereby the reduction ratio is increased.

Next, explanation will be given on the axle drive unit 2. As shown in FIG. 3, the axle drive unit 2 includes the transmission casing 3, the gear transmission 50, the differential gear mechanism 11, and the left and right rear axles 12. The transmission casing 3 is divided into left and right casing halves.

The left casing half is a first transmission casing half 3a, and the right casing half is a second transmission casing half 3b.

The gear transmission 50 includes a torque sensor 90 serving as a traveling load detection means, a forward high speed gear train 50H, a forward low speed gear train 50L and a backward gear train 50R. The gear transmission 50 performs the speed change (sub speed change) between the speed-change driving shaft 25, serving as an input shaft, and a speed-change driven shaft 26, serving as an output shaft.

The speed-change driving shaft 25 and the speed-change driven shaft 26 are axially laterally journalled in the transmission casing 3. The output pulley 42 of the CVT 40 is fixed on the speed-change driving shaft 25 so that the power of the CVT 40 is transmitted to the speed-change driving shaft 25. The right end of the speed-change driven shaft 26 is projected outward rightward from a right side surface of the second transmission casing half 3b of the transmission casing 3 and is inserted into a gear casing 36. The gear casing 36 is attached to the right side surface of the second transmission casing 3b. The right end of the speed-change driven shaft 26 is inserted into the gear casing 36 from the left side, and is journalled therein. The rear end of the output shaft 6 is inserted into the gear casing 36 from the front side, and is journalled therein. A bevel gear 45 is relatively unrotatably fixed on the right end of the speed-change driven shaft 26 so as to take off a power for driving the front wheels 104. A bevel gear 46 is relatively unrotatably fixed on the rear end of the output shaft 6, and meshes with the bevel gear 45. Accordingly, the power of the gear transmission 50 is transmitted to the output shaft 6 through the speed-change driven shaft 26, the bevel gear 45 and the bevel gear 46. A final pinion 26a is relatively unrotatably fixed on the left end of the speed-change driven shaft 26. The differential gear mechanism 11 differentially connecting the rear axles 12 to each other is provided on the downstream of the speed-change driven shaft 26.

The differential gear mechanism 11 includes a differential casing 62, a bull gear 61, differential side gears 65, a pinion shaft 63 and differential pinions 64. The differential casing 62 is pivoted in the transmission casing 3. The bull gear 61 is relatively unrotatably provided on the differential casing 62 and meshes with the final pinion 26a on the speed-change driven shaft 26. Proximal ends of the rear axles 12 are inserted into the differential casing 62 from the left and right sides respectively. The differential side gears 65 are relatively unrotatably provided on the tips of the rear axles 12. In the differential casing 62, the pinion shaft 63 is inserted perpendicularly to the rear axles 12, and the differential pinions 64 meshing with the differential side gears 65 are relatively rotatably provided on opposite ends of the pinion shaft 63.

A differential lock mechanism 11a is attached to the differential gear mechanism 11. The differential lock mechanism 11a includes a shifter 67 and a lock pin 68. The shifter 67 is slidably provided on a part of the differential casing 62 axially extended on one rear axle 12 (in this embodiment, the right axle 12). The lock pin 68 is fixed on the shifter 67 and is extended leftward toward a recess 65a formed in the right differential side gear 65 through the differential casing 62.

The differential lock mechanism 11a of the differential gear mechanism 11 is actuated as described below. With regard to the differential lock mechanism 11a, when the shifter 67 is shifted to a differential lock position by an external operation force, the lock pin 68 is engaged into the recess 65a of the right differential side gear 65 so that the right differential side gear 65 is fixed to the differential casing 62, thereby also fixing the left differential side gear 65 to the differential casing 62 through the differential pinions 64. Accordingly, the left and right differential side gears 65 are relatively unrotatably fixed to the differential casing 62 so as to cancel the differential rotation of the rear axles 12.

On the other hand, when the shifter 67 is operated to a differential position (an unlocking position), the lock pin 68 is removed from the recess 65a of the right differential side gear 65 so that the right differential side gear 65 is released from the differential casing 62, thereby also releasing the left differential side gear 65 from the differential casing 62 through the differential pinions 64. Accordingly, the differential side gears 65 become rotatable relative to the differential casing 62 so as to ensure the differential rotation of the rear axles 12.

Next, explanation will be given on the forward high speed gear train 50H. The forward high speed gear train 50H includes a forward high speed driving gear 25a relatively rotatably provided on the speed-change driving shaft 25, a forward high speed driven gear 51 relatively unrotatably provided on a first transmission member 58 and meshing with the forward high speed driving gear 25a, and a forward high speed clutch 73.

A left end portion of the forward high speed driving gear 25a is axially extended along the speed-change driving shaft 25, and is inserted into the forward high speed clutch 73. The first transmission member 58 is a cylindrical member relatively rotatably provided on an upstream detection member 91 of a later-discussed torque sensor 90 which is relatively rotatably provided on the speed-change driven shaft 26.

The forward high speed clutch 73 is a hydraulic clutch relatively unrotatably provided on the speed-change driving shaft 25. When the forward high speed clutch 73 is engaged, the power of the speed-change driving shaft 25 is transmitted through the forward high speed clutch 73 to the forward high speed driving gear 25a. When the forward high speed clutch 73 is disengaged, the transmission of power of the speed-change driving shaft 25 through the forward high speed clutch 73 to the forward high speed driving gear 25a is interrupted.

In detail, the forward high speed clutch 73 includes a clutch body 73a, a pressure plate 73b, a spring 73c, friction plates 73d and 73e, a first oil chamber 73g, and a second oil chamber 73h. A boss part of the clutch body 73a is relatively unrotatably fitted on the speed-change driving shaft 25. The clutch body 73a is expanded radially from the boss part, and is axially extended rightward along the speed-change driving shaft 25 so as to form a drum-shaped part. The forward high speed driving gear 25a has a leftward extended portion inserted into a space between the boss part and the drum-shaped part of the clutch body 73a. The friction plates 73d and 73e are alternately aligned axially in the space between the leftward extended portion of the forward high speed driving gear 25a and the drum-shaped part of the clutch body 73a. The friction plates 73d are relatively unrotatably and axially slidably engaged to the drum-shaped part of the clutch body 73a, and the friction plates 73e are relatively unrotatably and axially slidably engaged to the leftward extended portion of the forward high speed driving gear 25a.

In the clutch body 73a, the pressure plate 73b is provided slidably along the axis of the clutch body 73a, and an oil chamber is provided to be surrounded by the boss part and drum-shaped part of the clutch body 73a. The oil chamber is divided by the pressure plate 73b into a right first oil chamber 73g and a left second oil chamber 73h. The extended part of the forward high speed driving gear 25a is inserted into the first oil chamber 73g. A stopper 73i is fixed on a right end of the boss part of the clutch body 73a in the first oil chamber 73g, and the spring 73c is interposed between the stopper 73i and the pressure plate 73b. The spring 73c biases the pressure plate 73b opposite to the friction plates 73d and 73e.

On the other hand, a right end of the speed-change driving shaft 25 is projected rightward from the right side surface of the second transmission casing 3b of the transmission casing 3, and is pivoted in a shaft casing 22f attached to the right side surface of the second transmission casing 3b. A pressure oil passage 25e is formed axially in the speed-change driving shaft 25, and a lubricating oil passage 25d is formed in the speed-change driving shaft 25 parallel to the pressure oil passage 25e.

The left end of the pressure oil passage 25e is communicated with the second oil chamber 73h through an oil hole formed in the boss part of the clutch body 73a. The right end of the pressure oil passage 25e extended into the shaft casing 22f is communicated with an oil passage from a hydraulic pump 80 through an oil hole formed in a wall part of the shaft casing 22f. The left end of the lubricating oil passage 25d is communicated with the right first oil chamber 73g through an oil hole formed in the boss part of the clutch body 73a. The right end of the lubricating oil passage 25d extended into the shaft casing 22f is communicated with an oil passage from a hydraulic pump 80 through an oil hole formed in a wall part of the shaft casing 22f.

Figure 6:
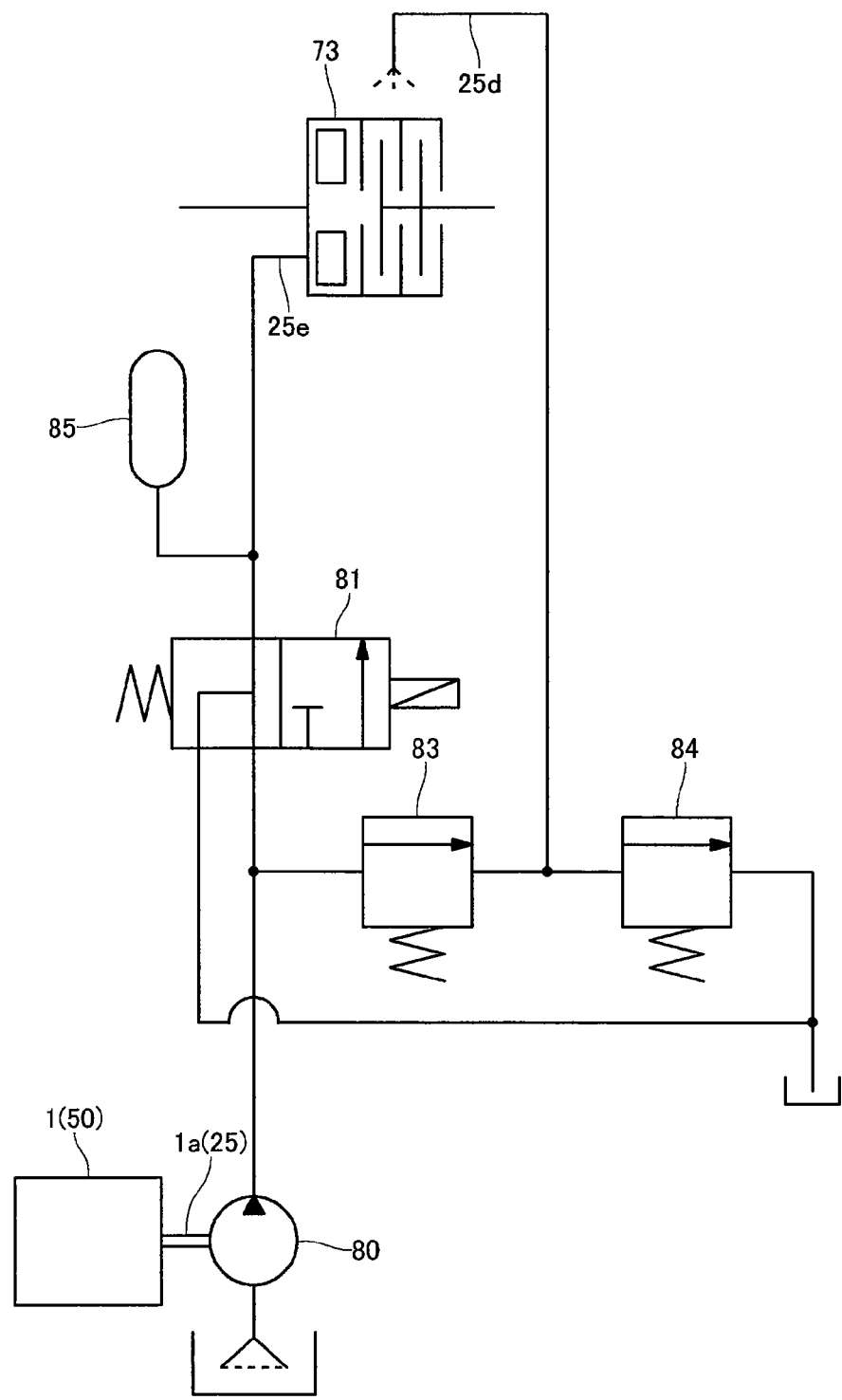
FIG. 6 is a hydraulic circuit diagram of the axle drive unit of the first embodiment.
Figure 7:
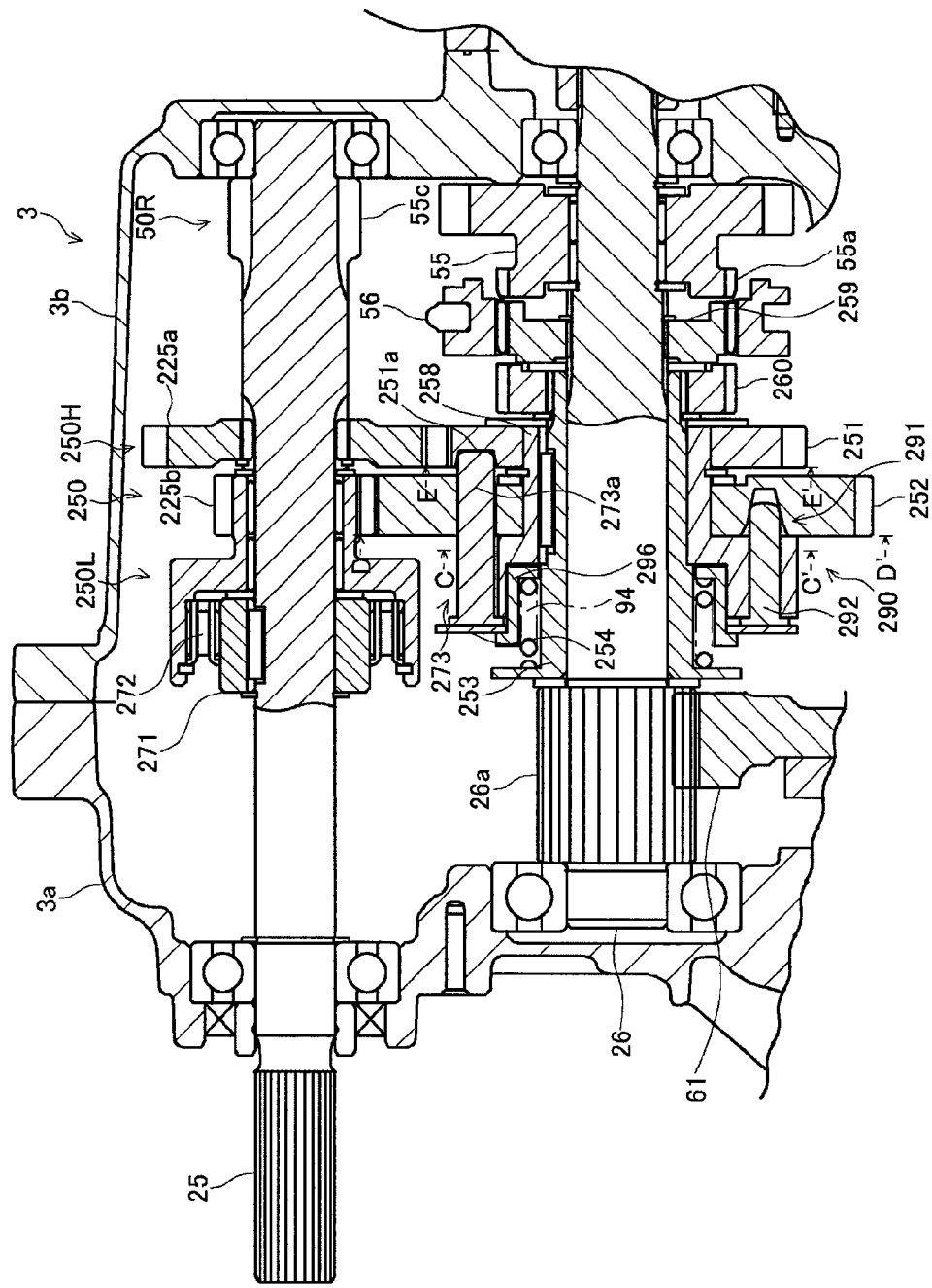
FIG. 7 is a sectional rear view of an axle drive unit of a second embodiment.

The hydraulic pump 80 is attached to the transmission casing 3. Due to the output shaft 1a of the engine 1, the input shaft of the gear transmission 50 (the speed-change driving shaft 25), an electric motor, or another drive member, the hydraulic pump 80 is driven so as to deliver pressure oil, thereby supplying the pressure oil to the forward high speed clutch 73. The oil passage of the hydraulic pump 80 is constructed by piping and/or the like, and is provided thereon with a switch valve 81, an accumulator 85, an oil pressure regulating valve 83, a lubricating oil regulating valve 84, as shown in FIG. 6.

The switch valve 81 is interposed in an oil passage between the hydraulic pump 80 and the pressure oil passage 25e. The switch valve 81 is switched between a supply position and a discharge position. When the switch valve 81 is disposed at the supply position, pressure oil from the hydraulic pump 80 is supplied to the second oil chamber 73h of the forward high speed clutch 73 through the pressure oil passage 25e and the like. When the switch valve 81 is disposed at the discharge position, the pressure oil is discharged from the second oil chamber 73h. The switch valve 81 is switched between the supply position and the discharge position by turning on or off an electric switch 86 serving as an electrically controlled switching actuator. When the electric switch 86 is turned on, the switch valve 81 is disposed at the discharge position.

When the electric switch 86 is turned off, the switch valve 81 is disposed at the supply position.

The accumulator 85 is interposed in an oil passage between the switch valve 81 and the pressure oil passage 25e. The accumulator 85 accumulates pressure oil from the hydraulic pump 80 so as to gradually (not suddenly) supply pressure oil to the forward high speed clutch 73.

The oil pressure regulating valve 83 is interposed in an oil passage between the hydraulic pump 80 and the switch valve 81. Excessive pressure oil in the oil passage is supplied as lubricating oil to the friction plates 73d and 73e and the spring 73c in the right first oil chamber 73g of the forward high speed clutch 73 via the oil pressure regulating valve 83 through the oil hole formed in the wall part of the shaft casing 22f, the lubricating oil passage 25d and the oil hole formed in the boss part of the clutch body 73a. The lubricating oil regulating valve 84 is interposed in an oil passage between the oil pressure regulating valve 83 and the lubricating oil passage 25d. Excessive pressure oil in the oil passage is returned through the lubricating oil regulating valve 84 to an oil sump in the transmission casing 3.

Action of the forward high speed clutch 73 will be described. When the electric switch 86 is turned off, the switch valve 81 is switched to the supply position, so that pressure oil from the hydraulic pump 80 is supplied to the second oil chamber 73h of the forward high speed clutch 73 through the switch valve 81 on the oil passage of the hydraulic pump 80, the accumulator 85, the oil hole formed in a wall of the shaft casing 22f, the pressure oil passage 25e formed in the speed-change driving shaft 25, and the oil hole formed in the boss part of the clutch body 73a. When the pressure oil is supplied to the second oil chamber 73h, the pressure plate 73b is slid toward the friction plates 73d and 73e against the biasing force of the spring 73c so as to press the friction plates 73d and 73e against each other, thereby engaging the forward high speed clutch 73. When the forward high speed clutch 73 is engaged, the power of the speed-change driving shaft 25 is transmitted through the engaged forward high speed clutch 73 and the forward high speed driving gear 25a to the forward high speed driven gear 51, and then transmitted from the forward high speed driven gear 51 to the first transmission member 58.

On the other hand, when the electric switch 86 is turned on, the switch valve 81 is switched to the discharge position, so that pressure oil supplied to the second oil chamber 73h of the forward high speed clutch 73 is discharged through the oil hole formed in the boss part of the clutch body 73a, the pressure oil passage 25e in the speed-change driving shaft 25, the oil hole formed in the wall part of the shaft casing 22f, and the switch valve 81 on the oil passage of the hydraulic pump 80. When the pressure oil in the second oil chamber 73h is discharged, the pressure plate 73b cannot resist the biasing force of the spring 73c, and is slid opposite to the friction plates 73d and 73e so as to separate the friction plates 73d and 73e from each other, thereby disengaging the forward high speed clutch 73. When the forward high speed clutch 73 is disengaged, the power of the speed-change driving shaft 25 to the forward high speed driving gear 25a is interrupted. Namely, the power of the speed-change driving shaft 25 is prevented from being transmitted to the forward high speed driven gear 51 and the first transmission member 58.

Next, explanation will be given on the forward low speed gear train 50L. As shown in FIG. 3, the forward low speed gear train 50L includes a forward low speed driving gear 25b relatively rotatably provided on the speed-change driving shaft 25, a forward low speed driven gear 52 relatively unrotatably provided on the first transmission member 58 and meshing with the forward low speed driving gear 25b, a forward low speed transmission member 71 relatively unrotatably provided on the speed-change driving shaft 25, and a forward low speed clutch 72. A right portion of the forward low speed driving gear 25b is expanded radially outward from the speed-change driving shaft 25 and is extended axially rightward along the speed-change driving shaft 25 so as to surround the forward low speed transmission member 71. The forward low speed clutch 72 is an overrunning clutch interposed between the forward low speed transmission member 71 and the forward low speed driving gear 25b, that is, between the forward low speed transmission member 71 and the extended part of the forward low speed driving gear 25b. The forward low speed clutch 72 has a plurality of sprags, and the sprags are arranged radially centering on the axis of the speed-change driving shaft 25. The overrunning clutch serving as the forward low speed clutch 72 is interlockingly connected to the forward high speed clutch 73 so that one of the clutches 72 and 73 is engaged and the other is disengaged, thereby selectively activating either the forward high speed gear train 50H or the forward low speed gear train 50L.

The engagement/disengagement action of the forward low speed clutch 72 will be described. When the forward high speed clutch 73 is engaged, the rotary power of the forward high speed driven gear 51 is also transmitted to the forward low speed driving gear 25b through the first transmission member 58 and the forward low speed driven gear 52. When the forward high speed clutch 73 is disengaged, the forward low speed driving gear 25b does not receive the rotary power of the forward high speed clutch 73. On the other hand, the power from the CVT 40 is constantly transmitted to the speed-change driving shaft 25. Consequently, when the forward high speed driven gear 51 is disengaged, the rotary speed of the forward low speed driving gear 25b is reduced and becomes lower than that of the forward low speed transmission member 71 (the speed-change driving shaft 25).

When the rotary speed of the forward low speed driving gear 25b is lower than that of the forward low speed transmission member 71 (the speed-change driving shaft 25), the sprags of the forward low speed clutch 72 are raised so as to relatively unrotatably engage the forward low speed driving gear 25b onto the forward low speed transmission member 71 (the speed-change driving shaft 25) through the raised sprags of the forward low speed clutch 72. When the forward low speed clutch 72 is engaged, the power of the speed-change driving shaft 25 (the forward low speed transmission member 71) is transmitted to the forward low speed driven gear 52 through the engaged forward low speed clutch 72 and the forward low speed driving gear 25b, and then is transmitted from the forward low speed driven gear 52 to the first transmission member 58.

The backward gear train 50R includes a backward driving gear 25c relatively unrotatably provided on the speed-change driving shaft 25, and a backward driven gear 55 relatively rotatably provided on the speed-change driven shaft 26 and meshing with the backward driving gear 25c through an idle gear. Therefore, the power of the speed-change driving shaft 25 is constantly transmitted through the backward driving gear 25c and the idle gear to the backward driven gear 55. Clutch teeth 55a is formed on the left side of the backward driven gear 55.

Next, explanation will be given on the torque sensor 90. As shown in FIG. 3, the torque sensor 90 includes the upstream detection member 91, a downstream detection member 96, a biasing member 94 and intermediate members 92. The upstream detection member 91 is a cylindrical member extended axially along the speed-change driven shaft 26, and is expanded at a left end thereof radially outward so as to form a discoid flange part. The upstream detection member 91 is relatively rotatably provided on the speed-change driven shaft 26 disposed on the downstream side of the forward high speed gear train 50H and the forward low speed gear train 50L. A second transmission member 59 is relatively unrotatably provided on the right end of the upstream detection member 91 between the first transmission member 58 and the backward driven gear 55 which are relatively rotatably provided on an upstream detection member 91. A shifter 56 is provided relatively unrotatably and axially (laterally) slidably on the second transmission member 59.

Figure 24:
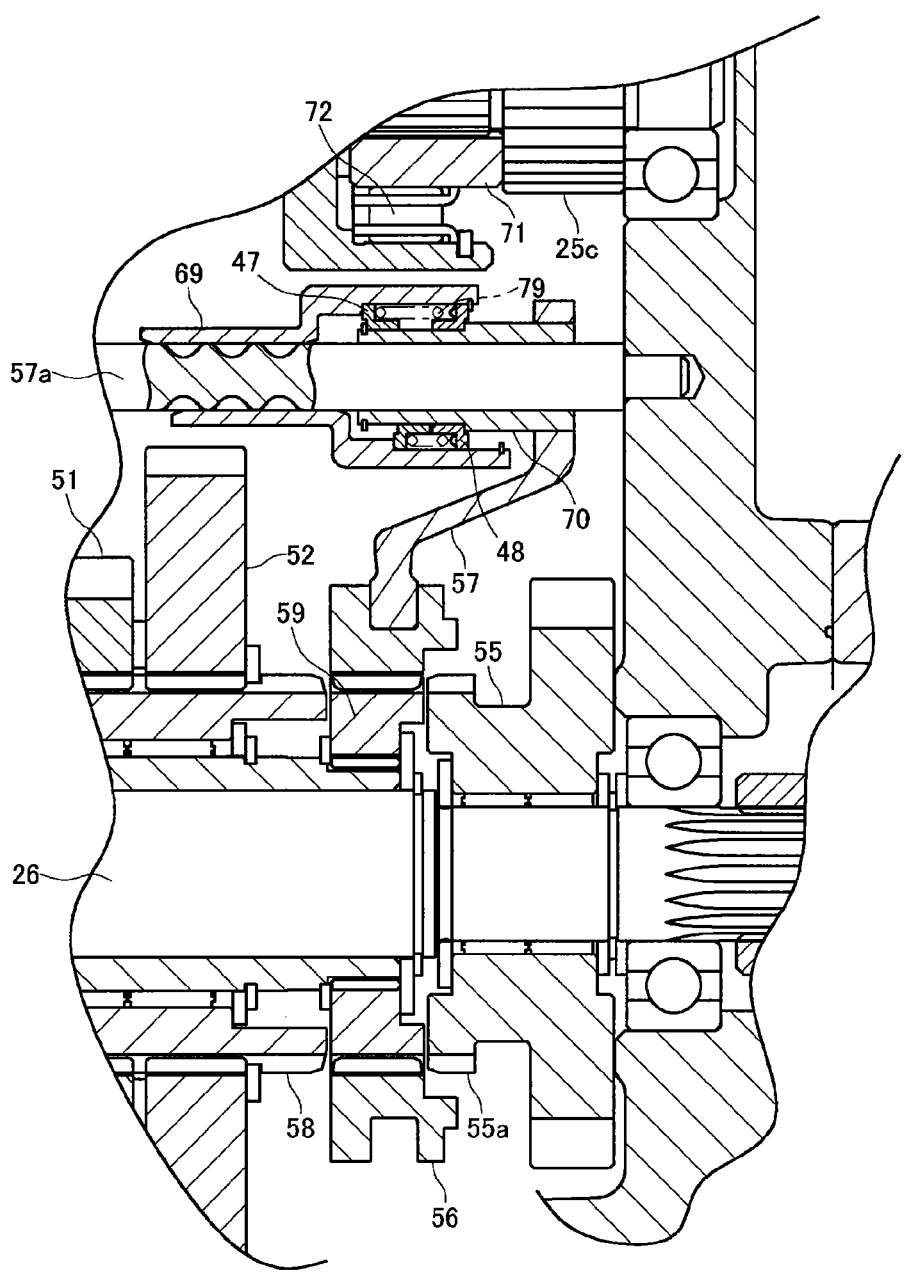
FIG. 24 is a sectional rear view of a shifter in FIG. 3.

As shown in FIG. 24, a shifting fork 57 is provided relatively rotatably and axially (laterally) unslidably on the shifter 56. The shifting fork 57 is fixed to a right end of a second boss member 70. A fork shaft 57a is spanned in the transmission casing 3 coaxially to the speed-change driven shaft 26 (laterally), and the second boss member 70 is provided relatively rotatably and axially (laterally) slidably on the fork shaft 57a. A first boss member 69 is provided relatively rotatably and axially (laterally) slidably on the fork shaft 57a leftward from the second boss member 70. A detent mechanism is interposed between the left portion of the first boss member 69 and the fork shaft 57a so that the first boss member 69, can be retained among three positions in the axial direction of the fork shaft 57a, i.e., a left position serving as a forward-driving position, a middle position serving as a neutral position, and a right position serving as a backward-driving position. In FIG. 24, for convenience in drawing, an upper portion of the first boss member 69 above the fork shaft 57a appears different from a lower portion of the first boss member 69 below the fork shaft 57a in the axial slide position thereof while both of upper and lower portions of the second boss member 70 above and below the fork shaft 57a appear coincide to each other in the axial slide position thereof.

The first boss member 69 is connected to a shifting selector (not shown) so that the fork shaft 57a is slid laterally by operating the shifting selector. A right portion of the first boss member 69 is formed diametrically larger than the left portion of the first boss member 69, and is extended axially along the fork shaft 57a. The left portion of the second boss member 70 is inserted into the right portion of the first boss member 69 so as to ensure a prescribed space between the first boss member 69 and the second boss member 70 in the radial direction of the fork shaft 57a.

In the space between the first and second boss members 69 and 70, a left first spring retainer 47 and a right second spring retainer 48 are provided axially (laterally) slidably on the left portion of the second boss member 70. A stopper is fixed on a right end of the first boss member 69, and a step is formed on an intermediate portion of the second boss member 70, thereby retaining the second spring retainer 48 so as to prevent the second spring retainer 48 from further rightward sliding. Also, a stopper is fixed on a left end of the second boss member 70, and a step is formed on an intermediate portion of the first boss member 69, thereby retaining the first spring retainer 47 so as to prevent the first spring retainer 47 from further leftward sliding. A compressed spring 79 is interposed between the first spring retainer 47 and the second spring retainer 48.

Accordingly, when the first boss member 69 is slid rightward from the neutral position to the backward-driving position by operating the shifting selector (not shown), the left end of the first spring retainer 47 is pushed rightward by the step of the first boss member 69 against the spring 79. While the teeth of the shifter 56 deviate from gaps among the clutch teeth 55a of the backward driven gear 55, the second boss member 70 slidably integrated with the shifter 56 is prevented from rightward sliding, so that the first spring retainer 47 is disposed at the right end thereof close to the left end of the second spring retainer 48 retained by the step of the second boss member 70, as appearing below the fork shaft 57a in FIG. 24. As soon as the teeth of the shifter 56 coincide to the gaps among the clutch teeth 55a, the second boss member 70 is slid rightward by the force of the spring 79, and finally abuts against the stopper of the first boss member 69, so that the second transmission member 59 meshes with the backward driven gear 55 through the shifter 56. In this state, while the backward driven gear 55 constantly receives power from the speed-change driving shaft 25 as mentioned above, the rotary power of the backward driven gear 55 is transmitted to the upstream detection member 91 through the shifter 56 and the second transmission member 59, thereby enabling the upstream detection member 91 to be rotatably integrated with the forward high speed gear train 50H, the forward low speed gear train 50L or the backward gear train 50R.

On the other hand, when the first boss member 69 is slid leftward from the neutral position to the forward-driving position by operating the shifting selector (not shown), the right end of the second spring retainer 48 is pushed leftward by the stopper of the first boss member 69 against the spring 79. While the teeth of the shifter 56 deviate from gaps among the clutch teeth of the first transmission member 58, the second boss member 70 slidably integrated with the shifter 56 is prevented from leftward sliding, so that the second spring retainer 48 is disposed at the left end thereof close to the right end of the first spring retainer 47 retained by the step of the first boss member 69. As soon as the teeth of the shifter 56 coincide to the gaps among the clutch teeth of the first transmission member 58, the second boss member 70 is slid leftward by the force of the spring 79, and finally abuts against the stopper of the second boss member 70, as appearing above the fork shaft 57a in FIG. 24, so that the second transmission member 59 meshes with the first transmission member 58 through the shifter 56. In this state, while the first transmission member 58 receives power from the speed-change driving shaft 25 through either the forward high speed gear train 50H or the forward low speed gear train 50L, the rotary power of the first transmission member 58 is transmitted to the upstream detection member 91 through the shifter 56 and the second transmission member 59.

The downstream detection member 96 is expanded at a right end thereof radially outward so as to form a discoid flange part. The downstream detection member 96 is extended leftward from the flange part axially along the speed-change driven shaft 26, and rollers 93 are interposed between the leftward extended part of the downstream detection member 96 and the speed-change driven shaft 26 so as to relatively unrotatably and axially (laterally) slidably engage the downstream detection member 96 to the speed-change driven shaft 26. The right end flange part of the downstream detection member 96 faces close to the left end flange part of the upstream detection member 91.

The traveling load detected by the torque sensor 90 is set based on the biasing force of the biasing member 94 for biasing one of the detection members 91 and 96 toward the other of the detection members 91 and 96. The biasing member 94 is interposed between a spring-retaining ring 95 fixed on the left end of the speed-change driven shaft 26 and the flange part of the downstream detection member 96. As discussed below, the biasing force of the biasing member 94 may be adjusted by changing the position of the spring-retaining ring 95 on the speed-change driven shaft 26. In this embodiment, the biasing member 94 biases the downstream detection member 96 toward the upstream detection member 91. Alternatively, the biasing member 94 may bias the upstream detection member 91 toward the downstream detection member 96.

Figure 20:
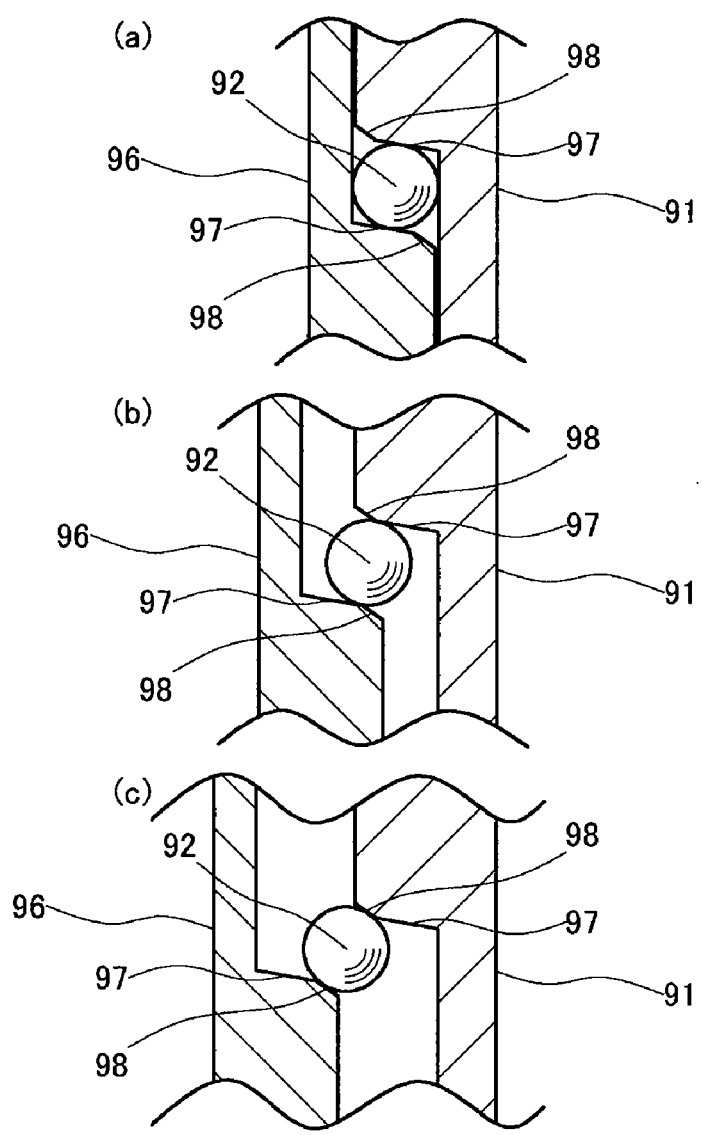
FIG. 20 is an enlarged sectional view of the torque sensor in FIGS. 3, 16, 18 and 19.
Figure 21:
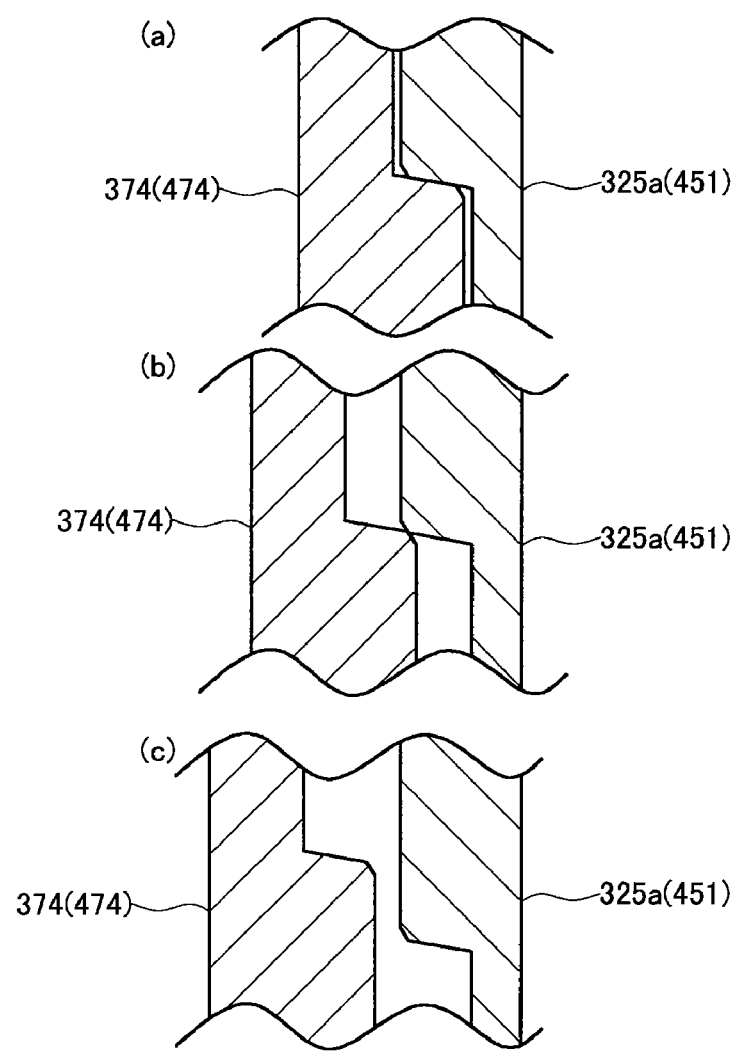
FIG. 21 is an enlarged sectional view of a dog clutch in FIGS. 16 and 18.

The intermediate members 92 are interposed between the flange part of the upstream detection member 91 and the flange part of the downstream detection member 96. As shown in FIG. 20, each of the flange parts of the detection members 91 and 96 includes first engagement parts 97 and second engagement parts 98 which are adapted to engage to the respective intermediate members 92. The upstream detection member 91 and the downstream detection member 96 are engaged with each other through the intermediate members 92 so as to restrict the relative movements therebetween in the peripheral direction of the speed-change driven shaft 26.

Figure 4:
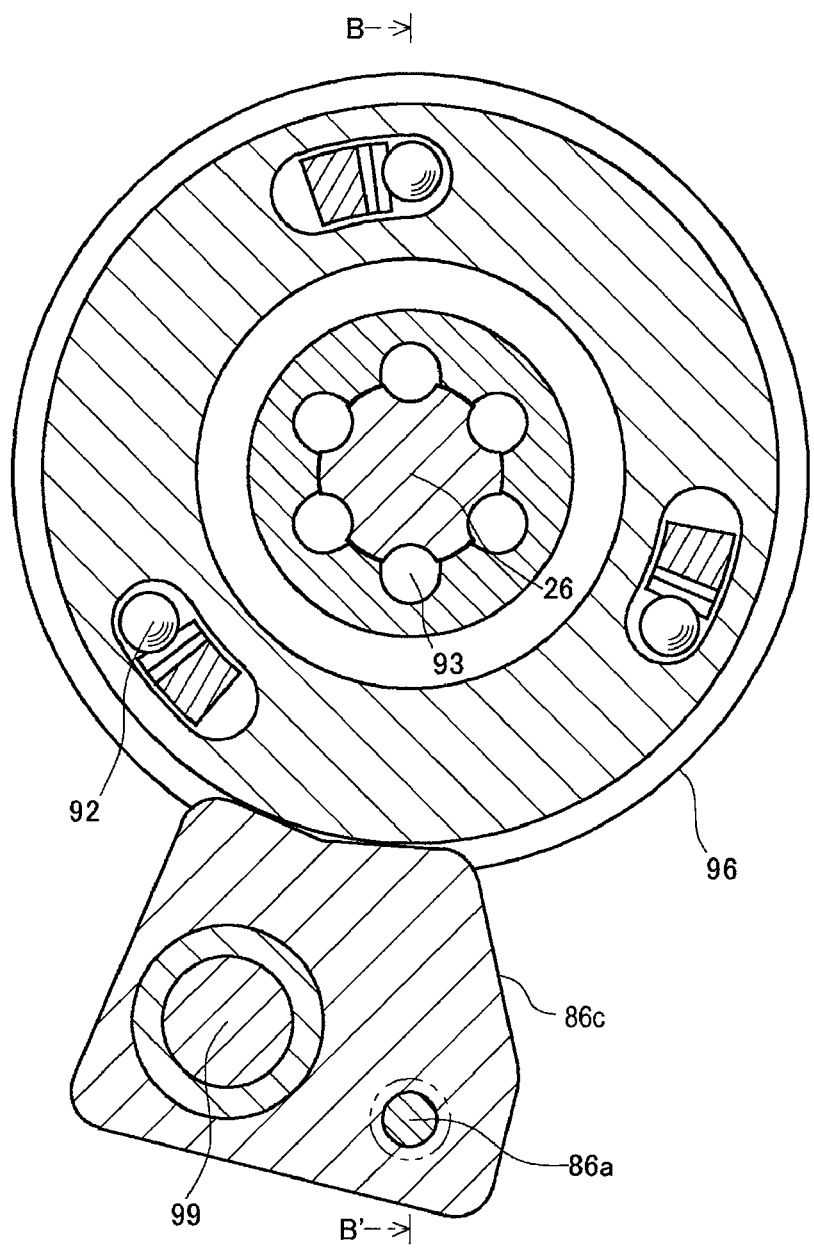
FIG. 4 is an arrow sectional view of the line A-A' in FIG. 3.

The three ball-shaped intermediate members 92 are interposed between the flange parts of the upstream and downstream detection members 91 and 96 so that they are aligned at regular intervals on a circle centered on the axis of the speed-change driven shaft 26 (so as to trisect the circle), i.e., they have equal distances thereamong and have equal radial distances from the axis of the speed-change driven shaft 26, as shown in FIG. 4. The intermediate members 92 are rotatable centered on the axis of the speed-change driven shaft 26 relative to both of the detection members 91 and 96 within predetermined degrees, and are axially movable along the speed-change driven shaft 26 within a predetermined degree.

The first engagement part 97 and the second engagement part 98 are surfaces formed on each of the upstream and downstream detection members 91 and 96 continuously to the vertical surface of the flange part. The surfaces of the first and second engagement parts 97 and 98 have different angles from each other with respect to the axis of the speed-change driven shaft 26 (the lateral direction). In detail, the first engagement part 97 is slanted against the axis of the speed-change driven shaft 26 (the lateral direction) at a prescribed angle (hereinafter, referred to as "the angle of the first engagement part 97). The second engagement part 98 is slanted against the axis of the speed-change driven shaft 26 (the lateral direction) at a prescribed angle (hereinafter, referred to as "the angle of the second engagement part 98"), which is different from the angle of the first engagement part 97. The first engagement part 97 and the second engagement part 98 are formed continuous to each other. The slant of the first engagement part 97 is gentler than that of the second engagement part 98. Namely, the slant of the second engagement part 98 is steeper than that of the first engagement part 97.

Accordingly, the rotary power of the upstream detection member 91, which is received from any of the forward high speed gear train 50H, the forward low speed gear train 50L and the backward gear train 50R, is transmitted to the speed-change driven shaft 26 through the intermediate members 92, the downstream detection member 96 and the rollers 93. The rotary power of the speed-change driven shaft 26 is transmitted to the differential gear mechanism 1 through the final pinion 26a.

Figure 5:
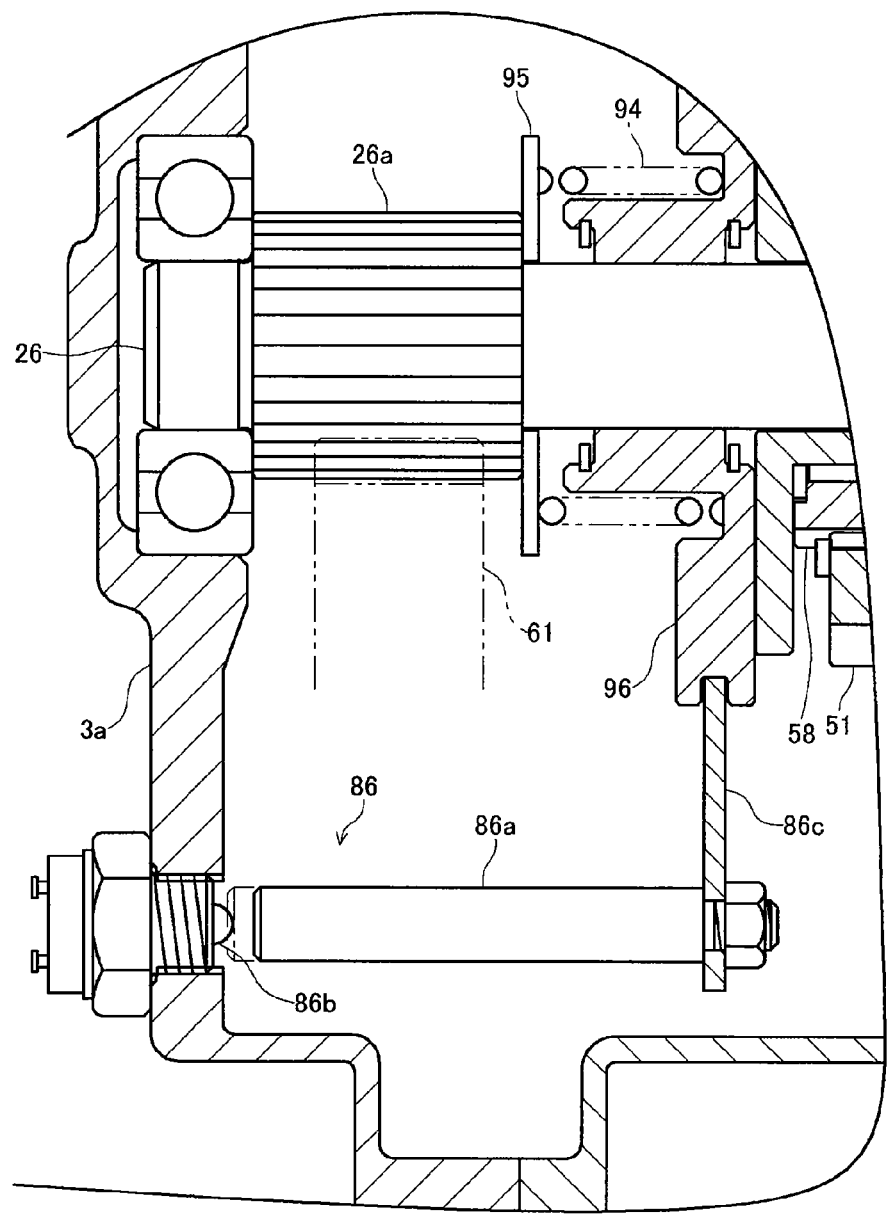
FIG. 5 is an arrow sectional view of the line B-B' in FIG. 3.

The electric switch device 86 is interlockingly connected to the downstream detection member 96. As shown in FIG. 5, the electric switch device 86 includes a switch operation member 86a, a switch 86b and a connection member 86c. The connection member 86c is a plate-shaped member, which is relatively rotatably connected to a lower portion of the flange part of the downstream detection member 96 around the speed-change driven shaft 26 so as to be axially unslidable along the speed-change driven shaft 26 (the lateral direction). A guide shaft 99 is spanned in the transmission casing 3 coaxially to the speed-change driven shaft 26 (the lateral direction), and the connection member 86c is provided slidably on the guide shaft 99. The switch operation member 86a penetrates a lower portion of the connection member 86c so as to project leftward from the left side surface of the connection member 86c. The switch 86b is provided on an inner side surface of the transmission casing 3 (a side surface of the first transmission casing 3a) or the like substantially coaxially to the switch operation member 86a so as to be able to touch the left end (touching surface) of the switch operation member 86a.

Explanation will be given on a process of changing an activated speed gear train of the gear transmission 50 from forward high speed gear train 50H to forward low speed gear train 50L when the torque sensor 90 detects an excessive traveling load. During the normal traveling (i.e., the traveling load is not excessive) of the working vehicle while the gear transmission 50 is set at the forward high speed stage, i.e., forward high speed clutch 73 is engaged so as to activate the forward high speed gear train 50H, power is smoothly transmitted from the forward high speed gear train 50H to the speed-change driven shaft 26 through the upstream detection member 91, the intermediate members 92 and the downstream detection member 96. In this state, as shown in FIG. 20(a), each of the intermediate members 92 is clamped between the respective first engagement parts 97 of the detection members 91 and 96, and receives thrust forces from the first engagement parts 97 of the respective detection members 91 and 96. Each of the thrust force is perpendicular to the first engagement part 97, and hereinafter, it is referred to as a force P1v. The thrust force P1v includes an axial (lateral) component force along the speed-change driven shaft 26 and a rotational (peripheral) component force around the axis of the speed-change driven shaft 26. Hereinafter, the axial component force is referred to as a force P1x, and the peripheral component force is referred to as a force P1y. In the case shown in FIG. 20(a), due to the slant of the first engagement 97, the force P1x is applied to the downstream detection member 96 leftward against the biasing member 94 (opposite to the biasing direction of the biasing member 94). When the force P1x overcomes the biasing force of the biasing member 94, the downstream detection member 96 slides leftward on the speed-change driven shaft 26 away from the upstream detection member 91.

When the traveling load applied on the speed-change driven shaft 26 (i.e., rotational resistance against the speed-change driven shaft 26) becomes a little excessive, the little excessive resistance against the speed-change driven shaft 26 is transmitted to the downstream detection member 96 through the rollers 93, thereby causing a little differential rotation of the downstream detection member 96 against the upstream detection member 91. Thus, as shown in FIG. 20(b), each of the intermediate members 92 rolls on the first engagement parts 97 toward the axis of the speed-change driven shaft 26 and approaches the second engagement parts 98, thereby causing a little axial leftward slide of the downstream detection member 96 along the speed-change driven shaft 26 against the biasing member 94 (opposite to the biasing direction of the biasing member 94).

When the traveling load applied on (the resistance against) the speed-change driven shaft 26 is further increased and becomes larger than a predetermined value (hereinafter, this predetermined value of the traveling load is referred to as "first switching point"), the differential rotation of the detection members 91 and 96 around the axis of the speed-change driven shaft 26 becomes large, so that, as shown in FIG. 20(c), each of the intermediate members 92 removes from the gap between the first engagement parts 97 and reaches the gap between the second engagement parts 98, i.e., it is clamped between the second engagement parts 98. Accordingly, the downstream detection member 96 is further slid leftward so as to become farthest from the upstream detection member 91.

When the downstream detection member 96 is slid leftward away from the upstream detection member 91, the switch operation member 86a connected through the connection member 86c to the downstream detection member 96 is interlockingly moved leftward according to the slide of the downstream detection member 96. When the switch operation member 86a reaches the limit of the leftward movement thereof, the left end (touching surface) of the switch operation member 86a touches the switch 86b so that the electric switch 86 is turned on. When the electric switch 86 is turned on, the switch valve 81 of the oil passage of the hydraulic pump 80 is switched to the discharge position so that the forward high speed clutch 73 is disengaged as mentioned above.

When the forward high speed clutch 73 is disengaged, the rotary speed of the forward low speed driving gear 25b is reduced and becomes lower than that of the forward low speed transmission member 71 (the speed-change driving shaft 25), and the sprags of the forward low speed clutch 72 are raised up, whereby the forward low speed clutch 72 is engaged. Accordingly, the activated speed gear train of the gear transmission 50 is switched from the forward high speed gear train 50H to the forward low speed gear train 50L.

Explanation will be given on a process of changing an activated speed gear train of gear transmission 50 from forward low speed gear train 50L to forward high speed gear train 50H when the excessive traveling load detected by the torque sensor 90 is reduced to a normal traveling load. Once each of the intermediate members 92 is clamped between the second engagement parts 98 as shown in FIG. 20(c) due to the excessive traveling load over the first switching point, each of the intermediate members 92 is kept clamped between the second engagement parts 98 unless the traveling load applied on the speed-change driven shaft 25 becomes lower than a predetermined value (hereinafter, this value is referred to as "a second switching point") which is lower than the first switching point. In this state, each of the intermediate members 92 applies a thrust force onto each second engagement part 98. This thrust force is perpendicular to the second engagement part 98, and hereinafter, it is referred to as a force P2v. The thrust force P2v is a resultant force of an axial (lateral) component force along the speed-change driven shaft 26 and a rotational (peripheral) component force around the axis of the speed-change driven shaft 26. Hereinafter, the axial component force is referred to as a force P2x, and the peripheral component force is referred to as a force P2y. In the case shown in FIG. 20(c), the force P2x is applied to the downstream detection member 96 leftward against the biasing member 94. When the force P2x is reduced, due to the force of the biasing member 94, the downstream detection member 96 slides rightward on the speed-change driven shaft 26 toward the upstream detection member 91.

As mentioned above, due to the leftward force P1x, the downstream detection member 96 tends to slide leftward against the biasing member 94 away from the upstream detection member 91. In other words, when a force applied leftward on the downstream detection member 96 is smaller than the force P1x, the downstream detection member 96 is slid rightward by the biasing force of the biasing member 94 toward the upstream detection member 91.

Here, the second engagement parts 98 are slanted against the axial direction of the speed-change driven shaft 26 (the lateral direction) more steeply than the first engagement parts 97. Namely, the direction of the force P2v applied perpendicularly to the surfaces of the second engagement parts 98 is slanted against the peripheral direction of the speed-change driven shaft 26 more steeply than the direction of the force P1v applied perpendicularly to the surfaces of the first engagement parts 97. Accordingly, when the force P2v is equal to the force P1v, the (lateral) axial component force P2x of the force P2v is larger than the (lateral) axial component force P1x of the force P1v in the axial direction of the speed-change driven shaft 26 (the lateral direction). In other words, when the force P2x is equal to the force P1x, the force P2v is smaller than the force P1v.

Accordingly, once the traveling load applied on the speed-change driven shaft 26 becomes larger than the first switching point and the activated speed gear train of the gear transmission 50 is switched from the forward high speed gear train 50H to the forward low speed gear train 50L, each of the intermediate members 92 is clamped between the second engagement parts 98 while the traveling load is reduced to the first switching point. Even while the force P2v equal to the fore P1v is applied on the second engagement parts 98 of the downstream detection member 96, the leftward force P2x which is larger than the force P1x is applied on the downstream detection member 96, so that the downstream detection member 96 is held at the leftward slid position away from the upstream detection member 91 against the biasing force of the biasing member 94.

When the traveling load applied on the speed-change driven shaft 26 is reduced to the second switching point and the force P2x applied on the downstream detection member 96 becomes smaller than the biasing force of the biasing member 94, the downstream detection member 96 is slid rightward toward the upstream detection member 91 by the biasing force of the biasing member 94.

When the downstream detection member 96 is slid rightward and is differentially rotated against the upstream detection member 91 around the axis of the speed-change driven shaft 26, each of the intermediate members 92 rolls on the second engagement parts 98 so as to move toward the upstream detection member 91 while rotating relative to the upstream detection member 91 and the downstream detection member 96.

When the downstream detection member 96 is slid rightward and differentially rotates against the upstream detection member 91 around the axis of the speed-change driven shaft 26, the each of intermediate members 92 removes from the gap between the second engagement parts 98 and enters the gap between the first engagement parts 97, so as to be clamped between the first engagement parts 97. Accordingly, the downstream detection member 96 is slid rightward so as to become the closest to the upstream detection member 91.

When the downstream detection member 96 is slid rightward toward the upstream detection member 91, the switch operation member 86a connected through the connection member 86c to the downstream detection member 96 is interlockingly moved rightward. When the switch operation member 86a reaches the limit of the rightward movement thereof, the left end (touching surface) of the switch operation member 86a is separated from the switch 86b so that the electric switch 86 is turned off. When the electric switch 86 is turned off, the switch valve 81 of the oil passage of the hydraulic pump 80 is switched to the supply position so that the forward high speed clutch 73 is engaged as mentioned above.

When the forward high speed clutch 73 is engaged, the rotary speed of the forward low speed driving gear 25b is increased and is relatively higher than that of the forward low speed transmission member 71 (the speed-change driving shaft 25) and the sprags of the forward low speed clutch 72 are laid, whereby the forward low speed clutch 72 is disengaged. Accordingly, the activated speed gear train of the gear transmission 50 is switched from the forward low speed gear train 50L to the forward high speed gear train 50H.

Due to the above-mentioned construction, as long as the traveling load slightly fluctuates between the first and second switching points, the switching of speed stage from the high speed stage to the low speed stage is prevented. Therefore, frequent switching of speed stage between the high speed stage and the low speed stage is prevented so as to stabilize the traveling of the vehicle. More specifically, the second switching point of the traveling load for switching the activated speed gear train from the forward low speed gear train 50L to the forward high speed gear train 50H is set lower than the first switching point of the traveling load for switching the activated speed gear train from the forward high speed gear train 50H to the forward low speed gear train 50L, thereby generating a hysteresis. Therefore, once the increasing traveling load becomes larger than the first switching point and the activated speed gear train is switched from the forward high speed gear train 50H to the forward low speed gear train 50L, the activation of the forward low speed gear train 50L is kept while the traveling load is larger than the second switching point which is lower than the first switching point even if the traveling load is reduced. This hysteresis can be obtained only by forming surfaces serving as the first and second engagement parts 97 and 98 on each of the flange parts of the upstream and downstream detection members 91 and 96 of the conventional torque sensor 90 using the ball-shaped intermediate members 92. That is, no additional component is needed for the hysteresis, thereby ensuring the compactness and inexpensiveness of the torque sensor 90.

The actuator for switching the forward high speed clutch 73 is the electric switch 86, and the torque sensor 90 is configured so as to turn on and off the electric switch 86 by the slide of the downstream detection member 96. Accordingly, the actuator and the configure of the torque sensor 90 for controlling the actuator is simple and compact in comparison with those when the actuator is a hydraulic valve control system.

The forward high speed clutch 73 is a hydraulic clutch which is engaged or disengaged depending on the traveling load. The forward high speed clutch 73 is provided on the shaft 25 different from the shaft 26 on which the torque sensor 90 is provided, that is, the forward high speed clutch 73 and the torque sensor 90 are distribute to the respective shafts 25 and 26, so that the gear transmission 50 can be compact in the direction of the shafts 25 and 26.

Explanation will be given on an axle drive unit according to a second embodiment. Components and portions shown in FIGS. 7 to 23 designated by the same reference numerals as those of the first embodiment have substantially the same construction. Therefore, detailed explanation thereof is omitted.

In the second embodiment shown in FIGS. 7 to 15, a gear transmission 250 includes a forward high speed gear train 250H, a forward low speed gear train 250L and the backward gear train 50R. The backward gear train 50R of the second embodiment has the same construction as that of the first embodiment.

The forward high speed gear train 250H includes a forward high speed driving gear 225a, a forward high speed driven gear 251 and a forward high speed clutch 273. The forward high speed driven gear 251 is relatively unrotatably provided on the speed-change driving shaft 25. The forward high speed driven gear 251 is relatively rotatably provided on a pin collar 258 and meshes with the forward high speed driving gear 225a. The pin collar 258 is a cylindrical member, which is relatively unrotatably provided on a third transmission member 253 relatively rotatably provided on the speed-change driven shaft 26. The left portion of the pin collar 258 is expanded radially outward from the speed-change driven shaft 26 and is axially extended leftward along the speed-change driven shaft 26 so as to ensure a predetermined space from the third transmission member 253. The third transmission member 253 is a cylindrical member relatively rotatably fitted on the speed-change driven shaft 26, and is expanded at a left end thereof radially from the speed-change driven shaft 26 so as to form a discoid flange part. A fourth transmission member 260 is relatively unrotatably fitted on a right end of the third transmission member 253. A second transmission member 259 is relatively unrotatably fitted on the speed-change driven shaft 26 rightward from the third transmission member 253 and the fourth transmission member 260.

Figure 8:
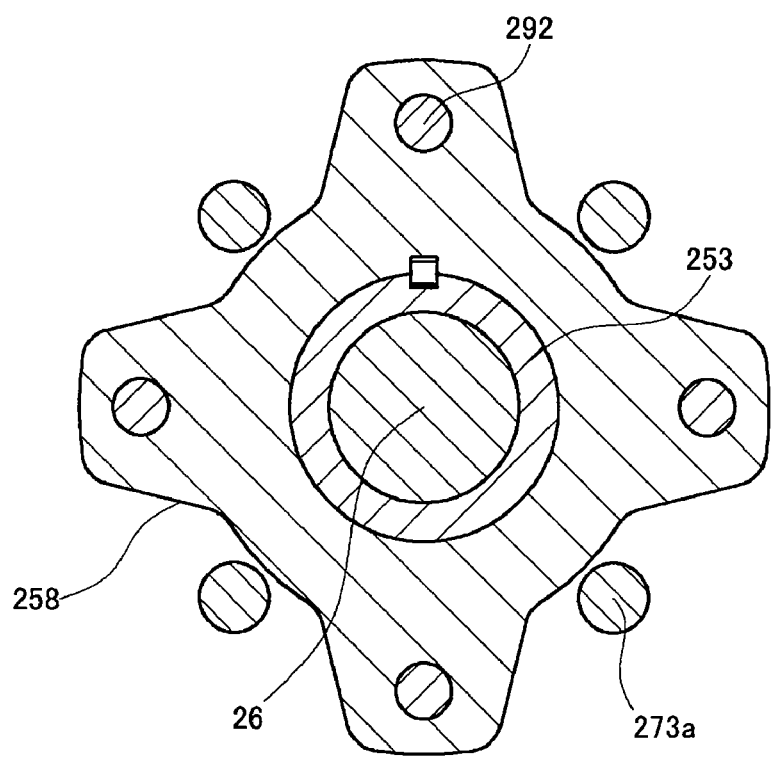
FIG. 8 is an arrow sectional view of the line C-C' in FIG. 7.
Figure 9:
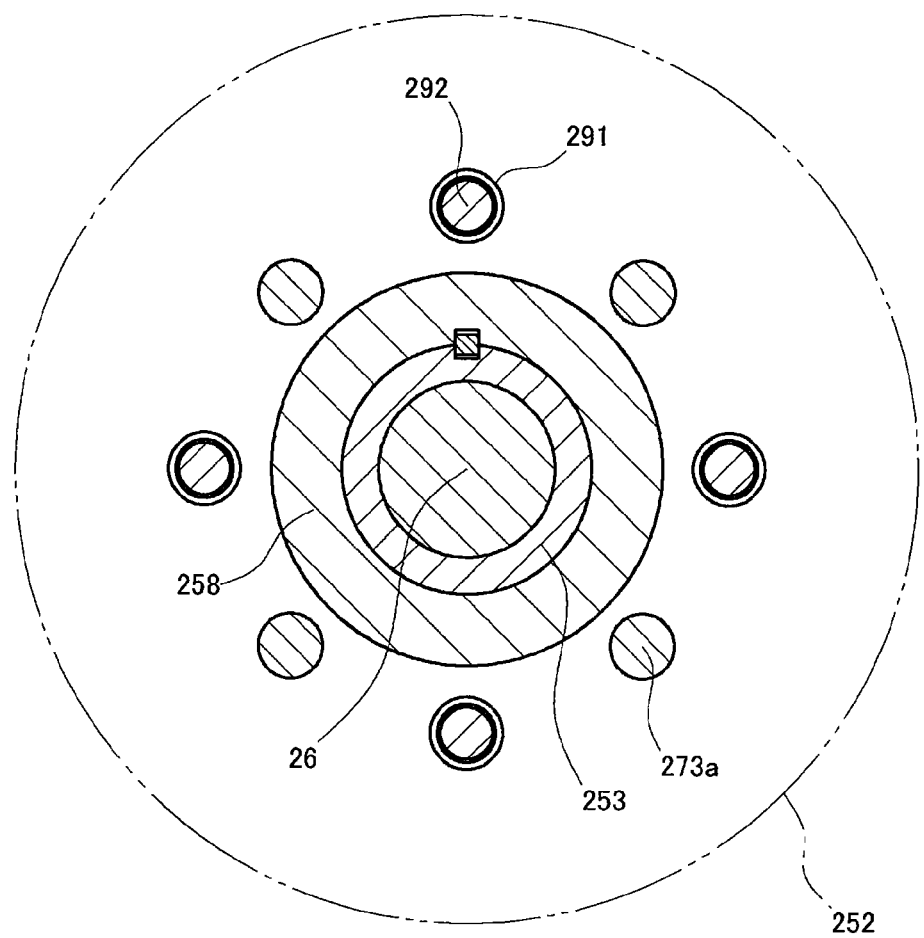
FIG. 9 is an arrow sectional view of the line D-D' in FIG. 7.
Figure 10:
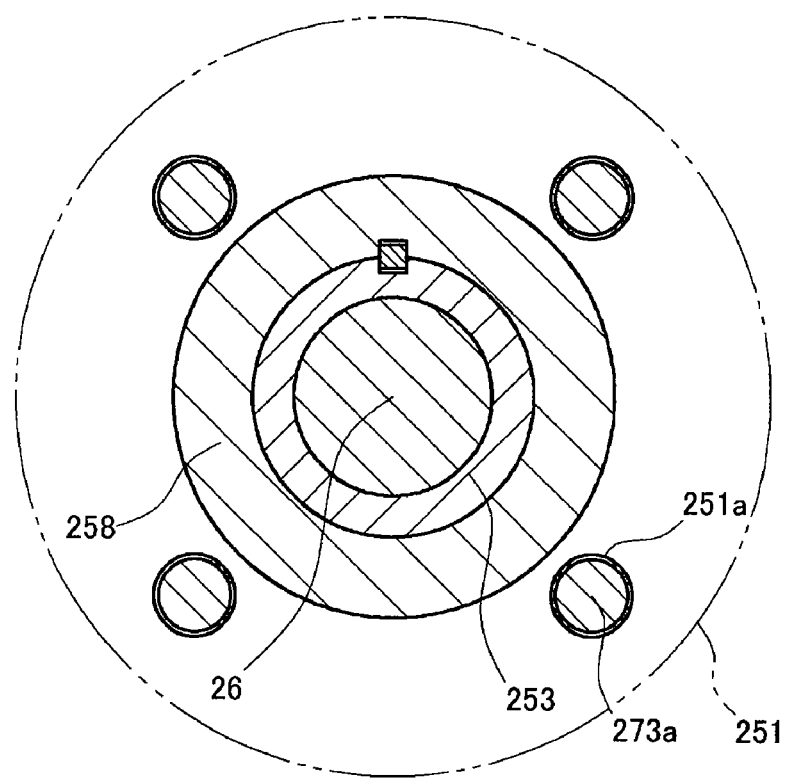
FIG. 10 is an arrow sectional view of the line E-E' in FIG. 7.

The forward high speed clutch 273 is a dog clutch having dog pins 273a. The axial direction of each of the dog pins 273a is the same as the axial direction of the speed-change driven shaft 26 (the lateral direction). The dog pins 273a are axially slidably integrally connected at left ends thereof to a discoid connection member 254, penetrate a forward low speed driven gear 252 relatively rotatably fitted on the pin collar 258, and are adapted to be engaged into respective dog holes 251a provided in the forward high speed driven gear 251. As shown in FIGS. 8 to 10, when viewed in the axis of the speed-change driven shaft 26, the dog pins 273a are aligned on a circle centered on the axis of the speed-change driven shaft 26 so as to quadrisect the circle (at regular intervals). The biasing member 94 is interposed between the flange part of the third transmission member 253 and a later-discussed slide member 296 so as to bias the dog pins 273a rightward.

The forward low speed gear train 250L includes a forward low speed driving gear 225b, the forward low speed driven gear 252, a forward low speed transmission member 271, and a forward low speed clutch 272. The forward low speed driving gear 225b is relatively rotatably provided on the speed-change driving shaft 25. The forward low speed driven gear 252 is relatively rotatably provided on the pin collar 258 and meshes with the forward low speed driving gear 225b. A left portion of the forward low speed driving gear 225b is expanded radially outward from the speed-change driving shaft 25 and is axially extended along the speed-change driving shaft 25 so as to surround the forward low speed transmission member 271. The forward low speed transmission member 271 and the forward low speed clutch 272 are similar to the corresponding member 71 and the corresponding clutch 72 of the first embodiment.

A torque sensor 290 includes the forward low speed driven gear 252 which also serves as an upstream detection member, torque sensing pins 292 which are downstream detection members, the slide member 296 and the biasing member 94. In the space between the pin collar 258 and the third transmission member 253, the forwardly opened cylindrical slide member 296 is relatively rotatably and axially (laterally) slidably fitted on the third transmission member 253. The biasing member 94 contacts the flange part of the third transmission member 253 at the front end thereof, and contacts the closed rear end surface of the slide member 296 at the rear end thereof.

The axial direction of each of the torque sensing pins 292 is the same as the axial direction of the speed-change driven shaft 26 (the lateral direction). The torque sensing pins 292 are axially slidably integrally connected at left ends thereof to the connection member 254, and axially slidably penetrate the pin collar 258. As shown in FIGS. 8 and 9, the torque sensing pins 292 are aligned on a circle centered on the axis of the speed-change driven shaft 26 so as to quadrisect the center (at regular intervals). The arrangement of the torque sensing pins 292 is shifted at an angle of 45 degrees from the arrangement of the dog pins 273*a* centered on the axis of the speed-change driven shaft 26. In the second embodiment, the forward low speed driven gear 252 also serves as the upstream detection member, and torque sensing holes 291 are provided in the forward low speed driven gear 252 to correspond to the respective torque sensing pins 292. Due to the rightward biasing force of the biasing member 94, the right ends of the torque sensing pins 292 penetrating the pin collar 258 are biased to be inserted into the respective torque sending holes 291. As shown in FIGS. 11 to 15, each of the torque sensing holes 291 is doubly tapered so as to include a first engagement part 297 and a second engagement part 298.

Figure 11:
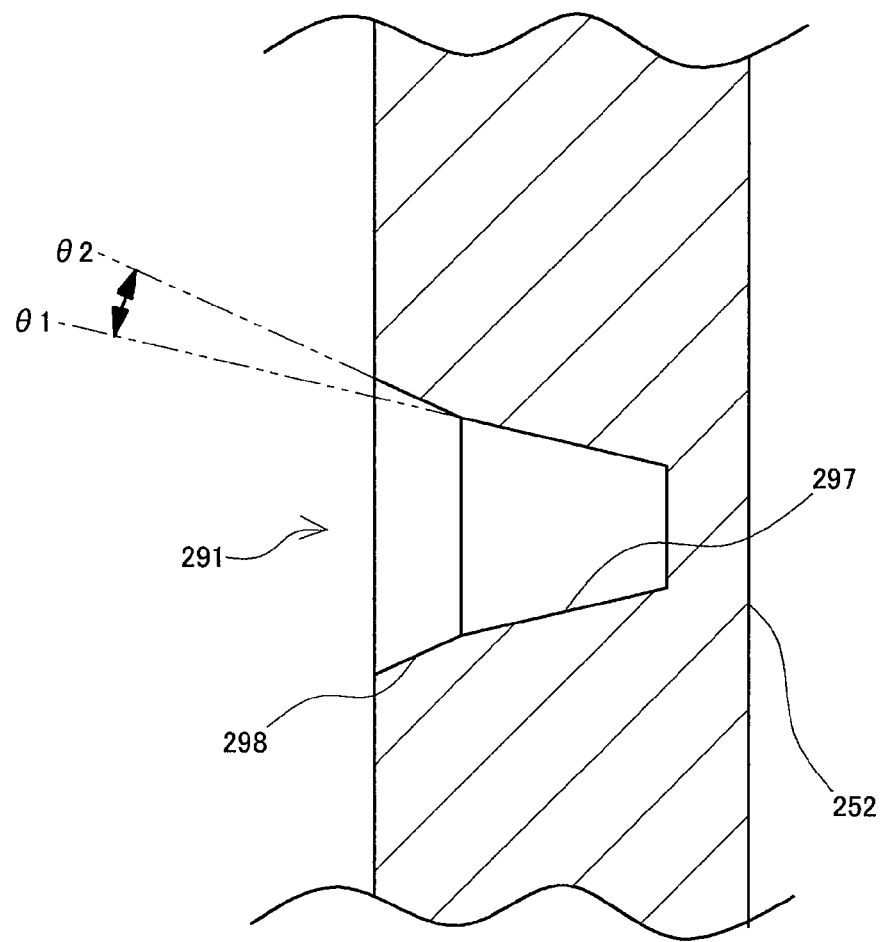
FIG. 11 is an enlarged sectional view of a torque sensing hole in FIG. 7.

The first engagement part 297 and the second engagement part 298 are tapered surfaces formed continuous to each other in each of the torque sensing holes 291, so that their angles about the axial direction of the speed-change driven shaft 26 (the lateral direction) are different from each other. More specifically, the first engagement part 297 is continuously extended from the deepest end of the torque sensing hole 291 and is leftwardly openly tapered (slanted) at a predetermined angle about the axial direction of the speed-change driven shaft 26 (the lateral direction). Hereinafter, this predetermined angle is referred to as a first engagement part angle $\theta 1$. The second engagement part 298 is continuously extended from the first engagement part 297 and is leftwardly openly tapered (slanted) at another predetermined angle about the axial direction of the speed-change driven shaft 26 (the lateral direction), which is different from the first engagement part angle $\theta 1$. Hereinafter, this predetermined angle of the second engagement part 298 is referred to as a second engagement part angle $\theta 2$. As shown in FIG. 11, the first engagement part angle $\theta 1$ is gentler than the second engagement part angle $\theta 2$. Namely, the second engagement part 298 is steeper than the first engagement part 297.

Figure 12:
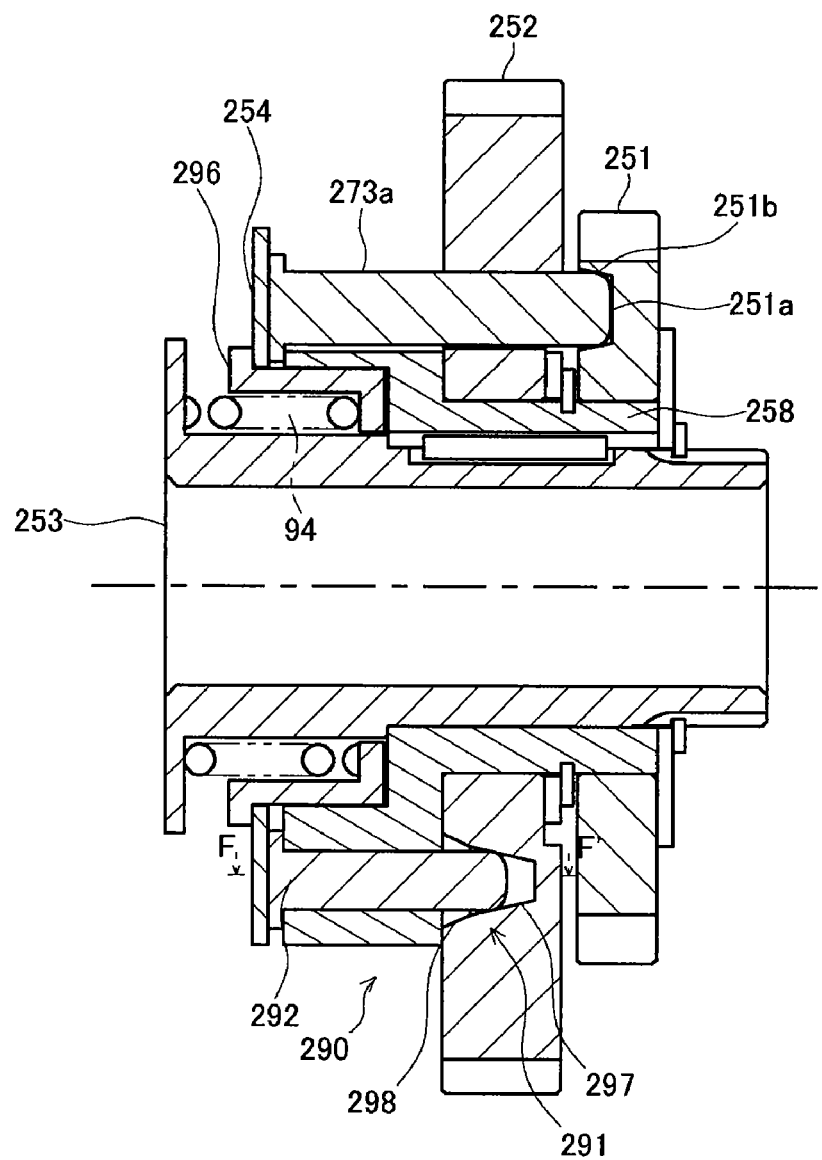
FIG. 12 is a sectional rear view of a torque sensor in the case that a forward traveling high speed gear train is selected.
Figure 13:
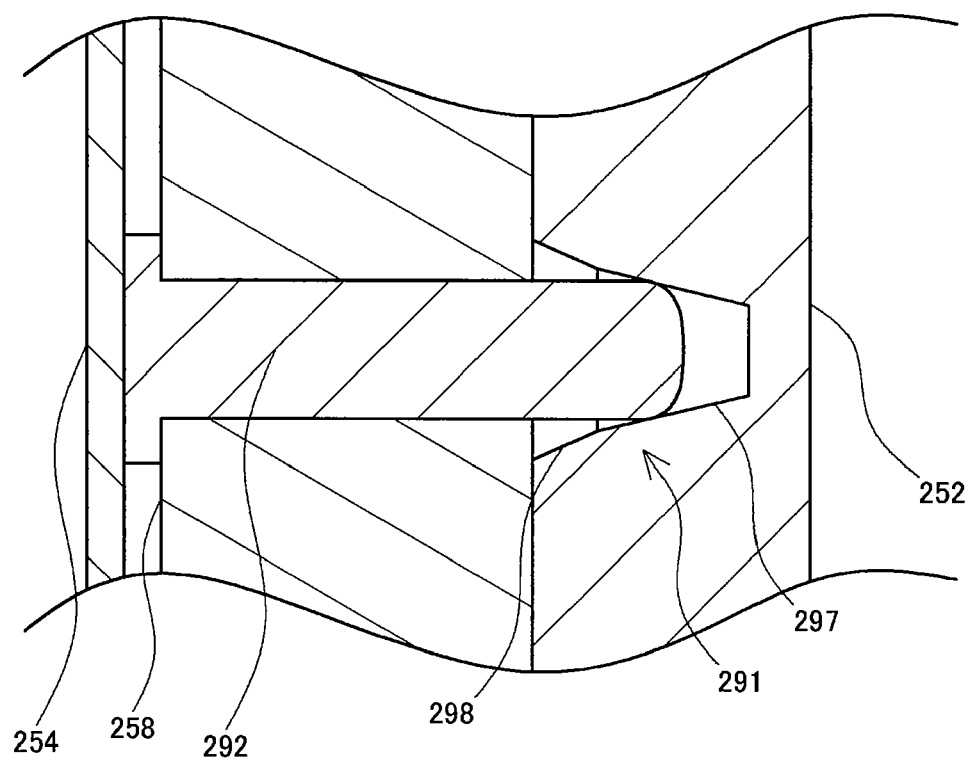
FIG. 13 is an arrow sectional view of the line F-F' in FIG. 12.

While the working vehicle travels forward at the forward high speed stage by engaging the forward high speed clutch 273 (i.e., by engaging the dog pins 273*a* into the respective dog holes 251*a* of the forward high speed driven gear 251) for activating the forward high speed train 250H, if the torque sensor 290 detects an excessive traveling load, the activated speed gear train of the gear transmission 250 is switched from the forward high speed gear train 250H to the forward low speed gear train 250L. This gearshift will now be explained. During the traveling of the vehicle under a normal traveling load, the rotary power of the speed-change driving shaft 25 is smoothly transmitted to the speed-change driven shaft 26 through the engaged forward high speed clutch 73 and the forward high speed gear train 250H, so that, as shown in FIGS. 12 and 13, each of the torque sensing pins 292 is engaged in each of the torque sensing holes 291 so as to be pressed against the surface of the first engagement part 297. In this state, each of the torque sensing pins 292 receives a reaction force from the forward low speed driven gear 252 perpendicular to the surface of the first engagement part 297. The reaction force applied on the torque sensing pin 292 is divided into an axial leftward component force along the speed-change driven shaft 26 (the lateral direction) and a rotational (peripheral) force around the axis of the speed-change driven shaft 26. Hereinafter, the reaction force applied on the torque sensing pin 292 is referred to as a force P1v, the axial leftward component force along the speed-change driven shaft 26 (the lateral direction) is referred to as a force P1x, and the rotational component force along the peripheral direction of the speed-change driven shaft 26 is referred to as a force P1y. The leftward force P1x resists against the biasing force of the biasing member 94.

As the traveling load applied on the speed-change driven shaft 26 (the resistance against the rotation of the speed-change driven shaft 26) becomes larger, the force P1x becomes larger relative to the biasing force of the biasing member 94, so that the torque sensing pins 292 tend to slide through the pin collar 258 leftward away from the forward low speed driven gear 252 against the biasing force of the biasing member 94.

Figure 14:
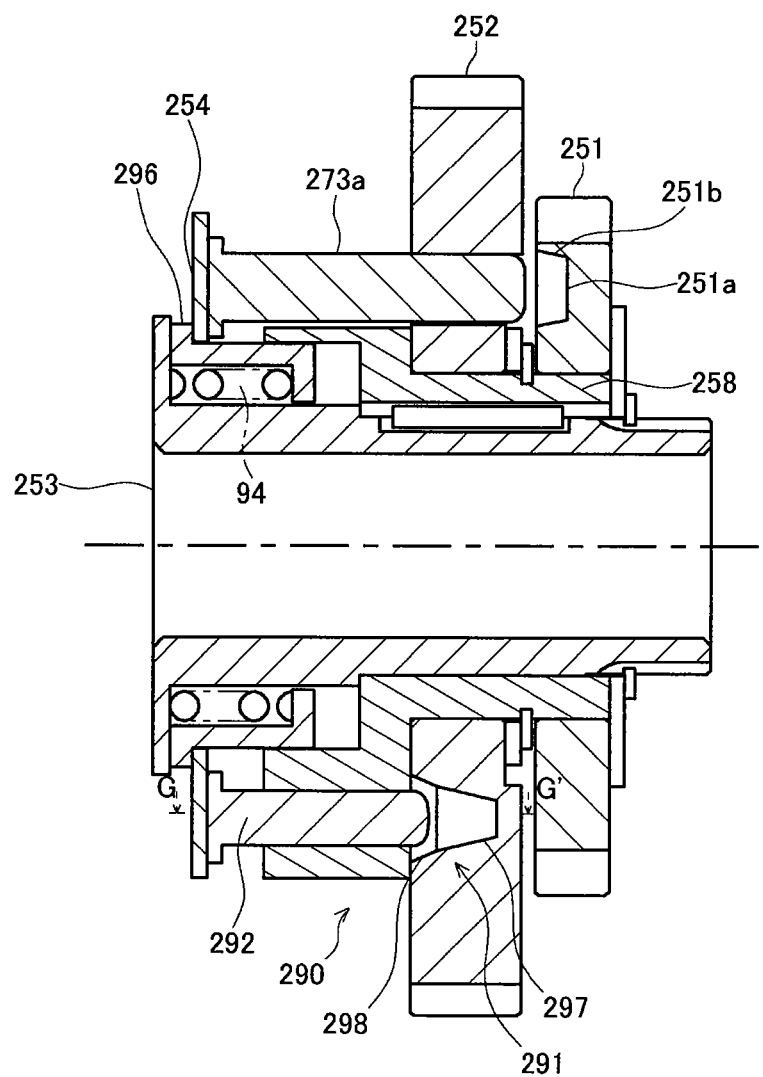
FIG. 14 is a sectional rear view of the torque sensor in the case a backward high speed gear train is selected.
Figure 15:
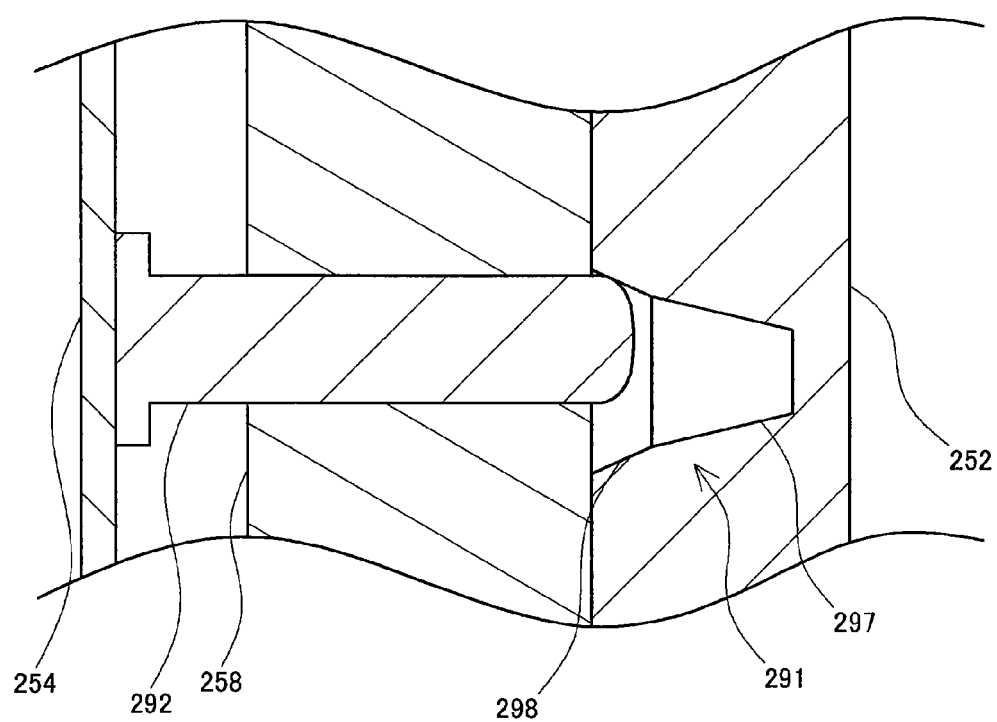
FIG. 15 is an arrow sectional view of the line G-G' in FIG. 14.

When the increased traveling load applied on the speed-change driven shaft 26 becomes larger than a predetermined value (hereinafter, referred to as "first switching point"), the right end of each of the torque sensing pins 292 in the torque sensing hole 291 is separated from the first engagement part 297, and is pressed against the second engagement part 298, as shown in FIGS. 14 and 15. The leftward sliding torque sensing pins 292 push the connection member 254 and the slide member 296 leftward together, whereby the slide member 296 reaches the farthest position from the forward low speed driven gear 252.

When the slide member 296 slides leftward by the thrust of the torque sensing pins 292, the dog pins 273*a* slide leftward together with the slide member 296 through the connection member 254. When the slide member 296 reaches the farthest position from the forward low speed driven gear 252, the leftwardly slid dog pins 273*a* are removed from the respective dog holes 251*a*, thereby disengaging the forward high speed clutch 273.

As shown in FIGS. 12 and 14, the inner peripheral surface of the dog hole 251*a* is tapered (slanted) at a predetermined angle about the axial direction of the speed-change driven shaft 26 (the lateral direction), and serves as an engagement part 251*b*. Accordingly, when the rotary power of the forward high speed driven gear 251 is transmitted to the speed-change driven shaft 26, each of the dog pins 273*a* is pressed against the surface of the engagement part 251*b* of the dog hole 251*a*, and receives a reaction force from the forward high speed driven gear 251 perpendicular to the surfaces of the engagement part 251*b*. This reaction force is divided into the axial leftward component force and the rotational component force, similar to the reaction force applied on the torque sending pin 292. Thus, while the torque sensing pins 292 pressed against the respective first engagement parts 297 of the torque sensing holes 291 tend to slide leftward due to the leftward component force P1x, the dog pins 273*a* pressed against the respective first engagement parts 297 also tend to slide leftward due to the left component force of the reaction force from the forward high speed driven gear 251 against the biasing member 94.

When the dog pins 273*a* are removed from the respective dog holes 251*a* so that the forward high speed clutch 273 is disengaged, the rotary speed of the forward low speed driving gear 225*b* is reduced and becomes lower than that of the forward low speed transmission member 271 (the speed-change driving shaft 25), whereby the sprags of the forward low speed clutch 272 are raised up, that is, the forward low speed clutch 272 is engaged. In this way, the activated speed gear train of the gear transmission 250 is switched from the forward high speed gear train 250H to the forward low speed gear train 250L.

When the excessive traveling load detected by the torque sensor 290 is reduced to a normal value, the activated speed gear train of the gear transmission 250 is switched from the forward low speed gear train 250L to the forward high speed gear train 250H. This gearshift will be described. Even if the excessive traveling load applied on the speed-change driven shaft 26 is reduced lower than the first switching point, as long as the traveling load is larger than a predetermined value which is lower than the first switching point (hereinafter, this predetermined value is referred to as "second switching point"), the torque sensing pins 292 are kept pressed against the second engagement part 298 as shown in FIGS. 14 and 15. Each of the torque sensing pins 292 pressed against the second engagement part 298 receives a reaction force from the forward low speed driven gear 252 perpendicular to the surface of the second engagement part 298. The reaction force applied on the torque sensing pin 292 is divided into an axial leftward component force along the speed-change driven shaft 26 (the lateral direction) and a rotational (peripheral) component force around the axis of the speed-change driven shaft 26. Hereinafter, the reaction force applied on the torque sensing pin 292 is referred to as a force P2v, the axial leftward component force is referred to as a force P2x, and the rotational component force is referred to as a force P2y.

As mentioned above, due to the leftward force P1x, the torque sensing pins 292 and the slide member 296 tend to slide away from the forward low speed driven gear 252 against the biasing member 94 (i.e., opposite to the biasing direction of the biasing member 94). In other words, when the leftward force applied on the torque sensing pins 292 and the slide member 296 becomes lower than the force P1x, the torque sensing pins 292 and the slide member 296 are slid by the biasing force of the biasing member 94 toward the forward low speed driven gear 252.

With respect to the axial direction of the speed-change driven shaft 26 (the lateral direction), the angle of the second engagement part 298 is steeper than the angle of the first engagement part 297. Namely, with respect to the peripheral direction of the speed-change driven shaft 26, the direction of the force applied perpendicular to the surface of the second engagement part 298 is steeper than the direction of the force applied perpendicular to the surface of the first engagement part 297. Accordingly, when the reaction force P2v from the second engagement part 298 is equal to the reaction force P1v from the first engagement part 297, the axial component force P2x of the force P2v is larger than the axial component force P1x of the force P1v. In other words, when the force P2x is equal to the force P1x, the force P2v is smaller than the force P1v.

After the forward high speed clutch 273 is disengaged and the forward low speed clutch 272 is engaged by the torque sensor 290 detecting the excessive traveling load over the first switching point, even if the traveling load is decreased to the first switching point, the torque sensing pins 292 are kept engaged with (pressed against) the second engagement part 298. In other words, even if the force P2v applied to the torque sensing pins 292 is reduced and becomes equal to the force P1v, the force P2x is still larger than the force P1x. Thus, the torque sensing pins 292 and the slide member 296 are held at the leftward slide position away from the upstream detection member 91.

Further, when the traveling load applied on the speed-change driven shaft 26 is decreased to the second switching point, the force P2x applied on the torque sensing pins 292 and the slide member 296 becomes smaller than the biasing force of the biasing member 94. Accordingly, the torque sensing pins 292 (with the slide member 296) are slid through the pin collar 258 rightward by the biasing force of the biasing member 94 toward the forward low speed driven gear 252, whereby each of the torque sensing pins 292 is separated from the second engagement part 298, and is pressed against (engaged with) the first engagement part 297, as shown in FIGS. 12 and 13.

When the torque sensing pins 292 are slid rightward, the slide member 296 slidably integrated with the torque sensing pins 292 through the connection member 254 also slide rightward toward the forward low speed driven gear 252. Accordingly, the dog pins 273a fixed through the connection member 254 to the slide member 296 are also slid rightward, and are finally engaged into the respective dog holes 251a of the forward high speed clutch 273, thereby engaging the forward high speed clutch 273.

When the forward high speed clutch 273 is engaged, the rotary speed of the forward low speed driving gear 225b is increased and becomes higher relative to that of the forward low speed transmission member 271 (the speed-change driving shaft 25), and the sprags of the forward low speed clutch 272 are laid, thereby disengaging the forward low speed clutch 272. In this way, the activated speed gear train of the gear transmission 250 is switched from the forward low speed gear train 250L to the forward high speed gear train 250H.

Either or both of the dog pins 273a and the torque sensing pins 292 are rotatable relative to the connection member 254, i.e., only slidably and relatively rotatably contact the right side surface of the connection member 254 at the left end thereof so as to be biased rightward by the biasing member 94. Accordingly, the shift of the torque sensing pins 292 between the first engagement parts 297 and the second engagement parts 298 in the respective torque sensing holes 291 do not interfere with the shift of the dog pins 273a to be engaged/disengaged into and from the respective dog holes 251a, thereby ensuring the smooth shifts of the torque sensing pins 292 and the dog pins 273a.

Due to the above-mentioned construction, as far as the variation of traveling load is within the range between the first and second switching points, the set high or low speed stage is maintained, thereby preventing frequent gearshift between the high speed stage and the low speed stage, and thereby stabilizing the traveling of the vehicle.

Namely, the second switching point for switching the activated speed gear train from the forward low speed gear train 250L to the forward high speed gear train 250H is lower than the first switching point for switching the activated speed gear train from the forward high speed gear train 250H to the forward low speed gear train 250L, and the difference of the traveling load between the first and second switching points is hysteresis. Therefore, once the increasing traveling load becomes larger than the first switching point and the activated speed gear train is switched from the forward high speed gear train 250H to the forward low speed gear train 250L, the activation of the low speed gear train 250L is kept while the traveling load is larger than the second switching point which is lower than the first switching point even if the traveling load is reduced.

The advantageous structure of the second embodiment is that the forward low speed driven gear 252 of the forward low speed gear train 250L also serves as the upstream detection member of the torque sensor 290, thereby reducing the number of parts, ensuring the compactness, and reducing costs. The dog pins 273a constituting the forward high speed clutch 273 are disposed in the forward low speed driven gear 252 juxtaposed to the forward high speed driven gear 251 so as to ensure the axial compactness of the gear transmission 250 provided with the torque sensor 290.

Further, as mentioned above, the forward high speed clutch 273 is connected mechanically to the torque sensing pin 292 which is the downstream detection member of the torque sensor 290, i.e., the mechanical connection construction, including the connection member 254, the slide member 296 and the like, is provided for connecting the torque sensor 290 to the forward high speed clutch 273, so that it is not necessary to provide any additional control means for controlling the forward high speed clutch 273.

Further, the forward high speed clutch 273 is provided coaxially to the torque sensor 290 with the mechanical connection construction, thereby ensuring the radial compactness of the gear transmission 250 provided with the torque sensor 290. Further, since the forward high speed clutch 273 is the simple dog clutch controlled according to detection of the load, the mechanical connection construction to connect the forward high speed clutch 273 to the torque sensing pins 292 serving as the downstream detection member of the torque sensor 290 can be simple.

Figure 16:
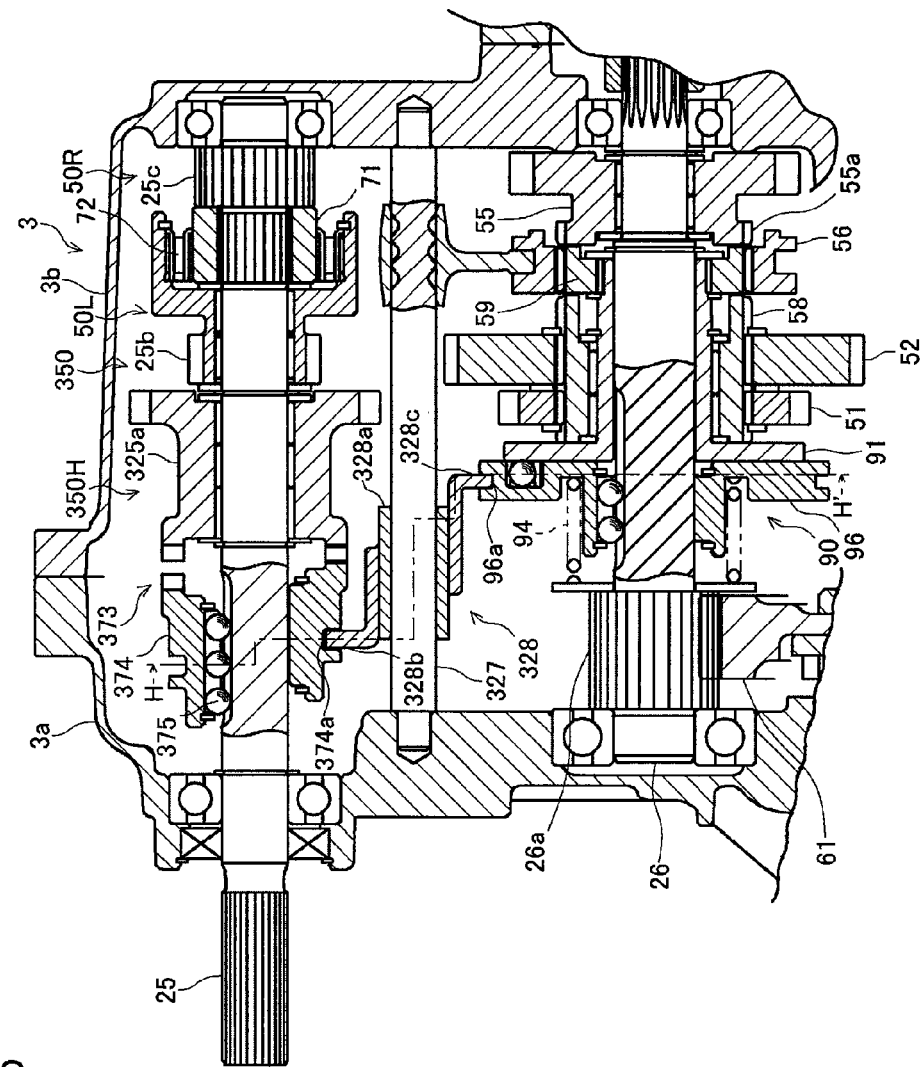
FIG. 16 is a sectional rear view of an axle drive unit of a third embodiment.
Figure 17:
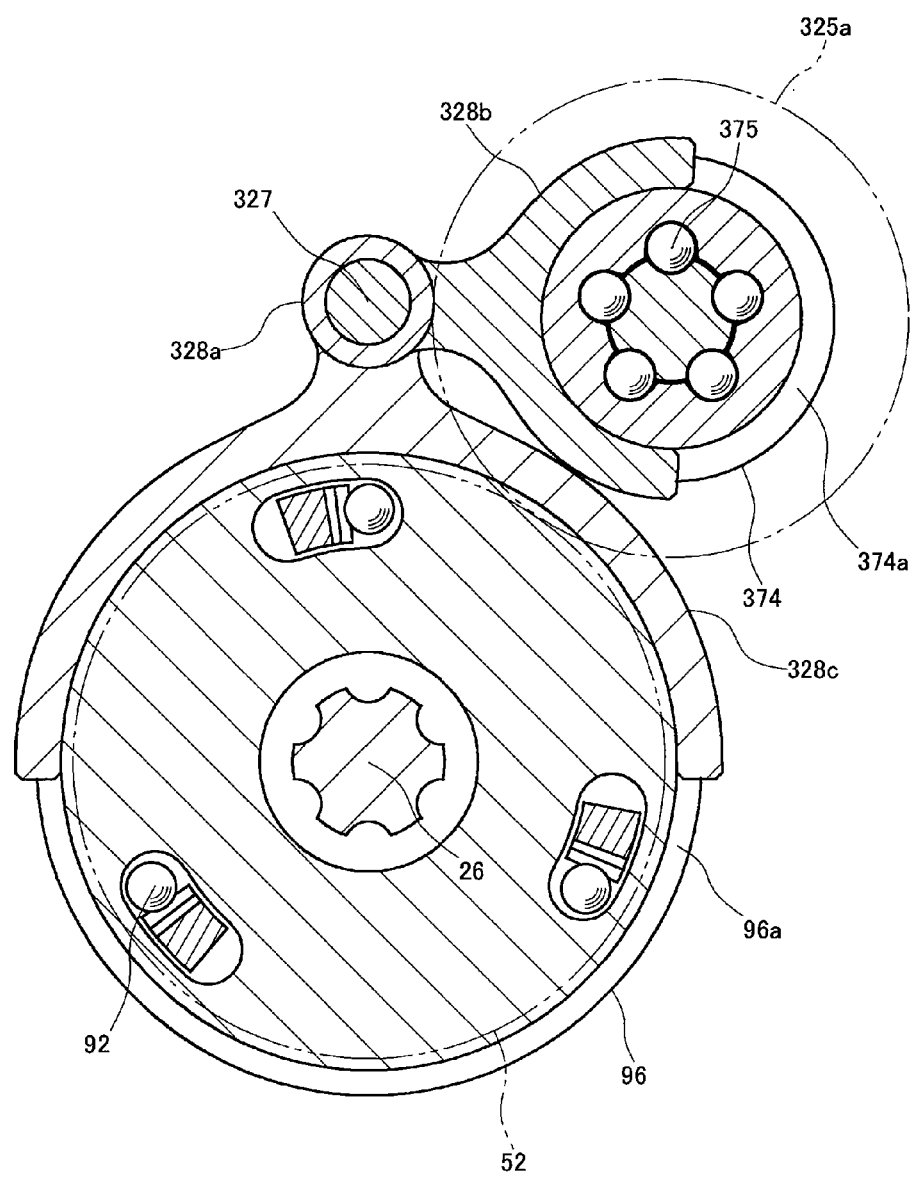
FIG. 17 is an arrow sectional view of the line H-H' in FIG. 16.

Next, explanation will be given on an axle drive unit according to a third embodiment shown in FIGS. 16 and 17. In this embodiment, a gear transmission 350 includes the torque sensor 90, a forward high speed gear train 350H, the forward low speed gear train 50L and the backward gear train 50R. The forward low speed gear train 50L and the backward gear train 50R of the third embodiment have substantially the same construction as those of the first embodiment.

The forward high speed gear train 350H includes a forward high speed driving gear 325a relatively rotatably provided on the speed-change driving shaft 25, the forward high speed driven gear 51 relatively unrotatably provided on the first transmission member 58 and meshing with the forward high speed driving gear 325a, and a forward high speed clutch 373. The forward high speed clutch 373 is a dog clutch. In detail, the forward high speed clutch 373 includes a clutch slide member 374 whose right side surface is formed thereon with a clutch-teeth part, and the forward high speed driving gear 325a is formed on a left side surface thereof with a clutch-teeth part corresponding to the clutch-teeth part of the slide member 374. The clutch slide member 374 is a circular member relatively unrotatably and axially (laterally) slidably fitted onto the speed-change driving shaft 25 through a roller 375 and coaxially to the forward high speed driving gear 325a.

A guide shaft 327 is spanned in the transmission casing 3 in parallel to the speed-change driving shaft 25 and the speed-change driven shaft 26 (the lateral direction). A guide member 328 includes a boss part 328a relatively rotatably and axially (laterally) slidably fitted on the guide shaft 327.

The guide member 328 further includes a first engagement part 328b and a second engagement part 328c, which are fixedly extended from the boss part 328a. When axially viewed, as shown in FIG. 17, the first engagement part 328b is extended horizontally and formed in an arc-shape at a tip end thereof. The arc-shaped part of the first engagement part 328b is relatively rotatably and axially (laterally) unslidably fitted on a substantial half peripheral edge of the clutch slide member 374. An annular groove 374a is peripherally formed on the clutch slide member 374, and the arc-shaped part of the first engagement part 328b is engaged into the groove 374a.

The second engagement part 328c is extended downward and formed in an arc-shape at a tip end thereof. The arc-shaped part of the second engagement part 328c is relatively rotatably and axially (laterally) unslidably fitted on a substantial half peripheral edge of the downstream detection member 96. An annular groove 96a is peripherally formed on the downstream detection member 96, and the arc-shaped part of the second engagement part 328c is engaged into the groove 96a.

Namely, the clutch slide member 374 and the downstream detection member 96 are axially slidably integrated with each other through the guide member 328. In detail, when the downstream detection member 96 is axially (laterally) slid on the speed-change driven shaft 26, the clutch slide member 374 is also axially (laterally) slid on the speed-change driving shaft 25.

The switching of the activated speed gear train of the gear transmission 350 from the forward high speed gear train 350H to the forward low speed gear train 50L when the torque sensor 90 detects an excessive traveling load will be described. The torque sensor 90 of the third embodiment is the same as that of the first embodiment. When the traveling load applied on the speed-change driven shaft 26 is increased and becomes larger than the first switching point, the downstream detection member 96 is slid leftward on the speed-change driven shaft 26 away from the upstream detection member 91 against the biasing member 94.

As the downstream detection member 96 is slid leftward away from the upstream detection member 91, the clutch slide member 374 axially slidably integrated with the downstream detection member 96 through the guide member 328 also slides leftward on the speed-change driving shaft 25 away from the forward high speed driving gear 325a, thereby disengaging the clutch-teeth part of the clutch slide member 374 from the clutch-teeth part of the forward high speed driving gear 325a, i.e., disengaging the forward high speed clutch 373.

When the forward high speed clutch 373 is disengaged, the rotary speed of the forward low speed driving gear 25b is reduced and becomes lower than that of the forward low speed transmission member 71 (the speed-change driving shaft 25) and the sprags of the forward low speed clutch 72 are raised up, whereby the forward low speed clutch 72 is engaged. Accordingly, the activated speed gear train of the gear transmission 350 is switched from forward high speed gear train 350H to the forward low speed gear train 50L.

The switching of the activated speed gear train of the gear transmission 350 from the forward low speed gear train 50L to the forward high speed gear train 350H when the torque sensor 90 detects reduction of the traveling load will be described. When the traveling load applied on the speed-change driven shaft 26 becomes lower than the second switching point which is set lower than the first switching point, the downstream detection member 96 is axially slid rightward on the speed-change driven shaft 26 by the biasing force of the biasing member 94 rightward toward the upstream detection member 91.

When the downstream detection member 96 is slid rightward on the speed-change driven shaft 26 toward the upstream detection member 91, the clutch slide member 374 axially slidably integrated with the downstream detection member 96 through the guide member 328 also slides rightward on the speed-change driving shaft 25 toward the forward high speed driving gear 325a, thereby engaging the clutch-teeth part of the clutch slide member 374 with the clutch-teeth part of the forward high speed driving gear 325a, i.e., engaging the forward high speed clutch 373.

When the forward high speed clutch 73 is engaged, the rotary speed of the forward low speed driving gear 25b is increased and is relatively higher than that of the forward low speed transmission member 71 (the speed-change driving shaft 25) and the sprags of the forward low speed clutch 72 are laid, thereby disengaging the forward low speed clutch 72. Accordingly, the activated speed gear train of the gear transmission 350 is switched from the forward low speed gear train 50L to the forward high speed gear train 350H.

Due to the above-mentioned construction, as far as the variation of traveling load is within the range between the first and second switching points, the set high or low speed stage is maintained, thereby preventing frequent gearshift between the high speed stage and the low speed stage, and thereby stabilizing the traveling of the vehicle. Namely, the second switching point for switching the activated speed gear train from the forward low speed gear train 50L to the forward high speed gear train 350H is lower than the first switching point for switching the activated speed gear train from the forward high speed gear train 350H to the forward low speed gear train 50L, and the difference of the traveling load between the first and second switching points is hysteresis. Therefore, once the increasing traveling load becomes larger than the first switching point and the activated speed gear train is switched from the forward high speed gear train 350H to the forward low speed gear train 50L, the activation of the low speed gear train 50L is kept while the traveling load is larger than the second switching point which is lower than the first switching point even if the traveling load is reduced.

Further, as mentioned above, the forward high speed clutch 373 is connected mechanically to the downstream detection member 96 of the torque sensor 90, i.e., the mechanical connection construction including the guide member 328 is provided for connecting the torque sensor 90 to the forward high speed clutch 373, so that it is not necessary to provide any additional control means for controlling the forward high speed clutch 373. Further, the forward high speed clutch 373 is provided non-coaxially to the torque sensor 90 with the mechanical connection construction, thereby ensuring the axial compactness of the gear transmission 350 provided with the torque sensor 90. Further, since the forward high speed clutch 373 is the simple dog clutch controlled according to detection of the load, the mechanical connection construction to connect the forward high speed clutch 373 to the downstream detection member 96 of the torque sensor 90 can be simple.

Figure 18:
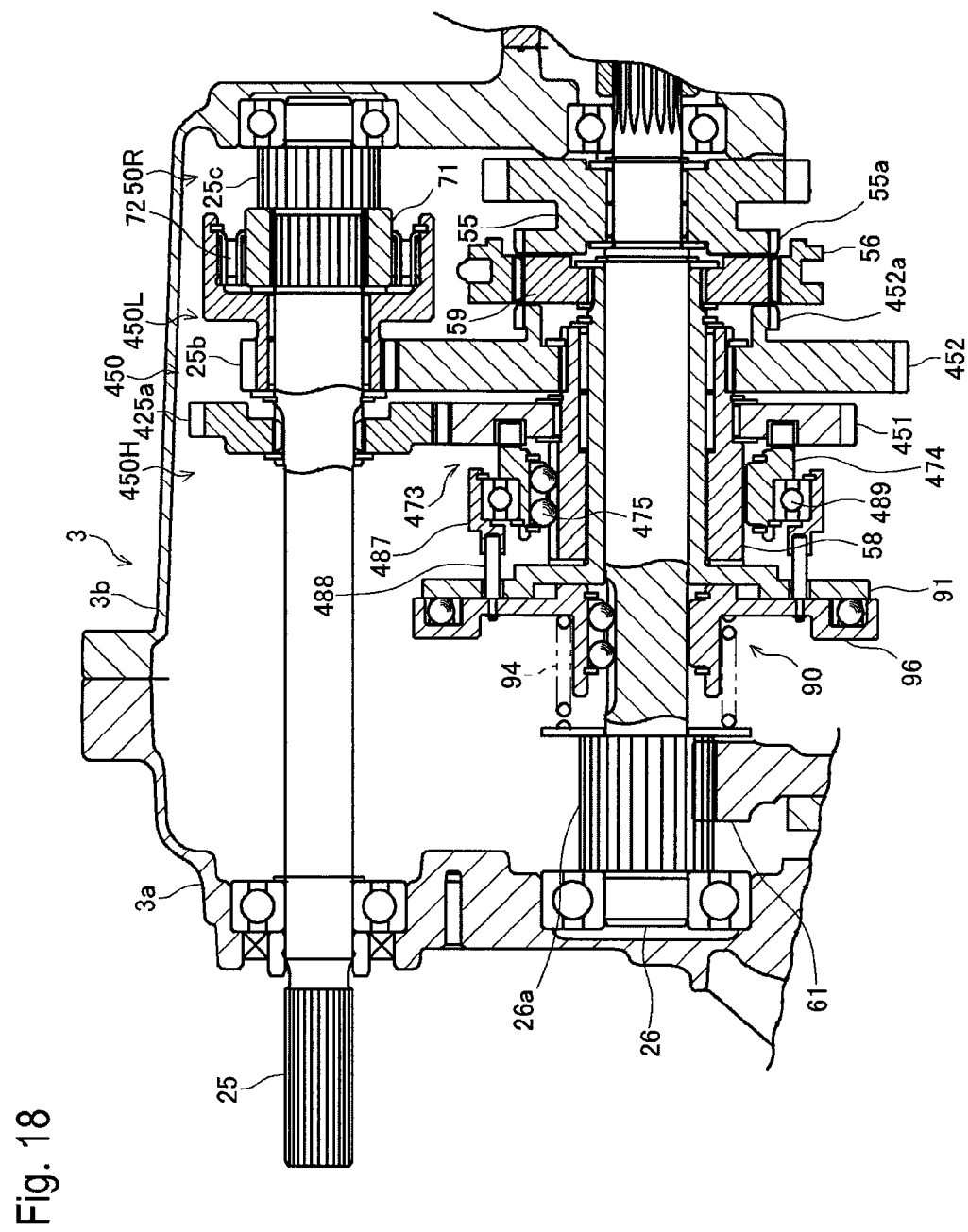
FIG. 18 is a sectional rear view of an axle drive unit of a fourth embodiment.

Next, explanation will be given on an axle drive unit of a fourth embodiment shown in FIG. 18. In the fourth embodiment, a gear transmission 450 includes the torque sensor 90, a forward high speed gear train 450H, a forward low speed gear train 450L and the backward gear train 50R. The forward high speed gear train 450H includes a forward high speed driving gear 425a relatively unrotatably provided on the speed-change driving shaft 25, a forward high speed driven gear 451 relatively rotatably provided on the first transmission member 58 and meshing with the forward high speed driving gear 425a, and a forward high speed clutch 473. The forward high speed clutch 473 is a dog clutch.

The forward high speed clutch 473 includes a clutch slide member 474 which is relatively unrotatably and axially (laterally) slidably fitted onto the first transmission member 58 through rollers 475. In the forward high speed clutch 473, pawls are formed on a right side surface of the clutch slide member 474 and recesses corresponding to the respective pawls are formed on a left side surface of the forward high speed driven gear 451. A first connection member 487 is disposed around the clutch slide member 474 and is relatively rotatably fitted onto the clutch slide member 474 through a bearing 489. The first connection member 487 is axially (laterally) slidably integrally connected through a second connection member 488 to the downstream detection member 96.

In this way, the clutch slide member 474 and the downstream detection member 96 are integrated with each other through the bearing 489 axially (laterally) slidably along the speed-change driven shaft 26. Namely, when the downstream detection member 96 is axially (laterally) slid on the speed-change driven shaft 26 along the speed-change driven shaft 26, the clutch slide member 474 is also slid together with the downstream detection member 96 axially (laterally) along the speed-change driven shaft 26.

The forward low speed gear train 450L includes the forward low speed driving gear 25b relatively rotatably provided on the speed-change driving shaft 25, a forward low speed driven gear 452 relatively unrotatably provided on the first transmission member 58 and meshing with the forward low speed driving gear 25b, the forward low speed transmission member 71 relatively unrotatably provided on the speed-change driving shaft 25, and the forward low speed clutch 72. The forward low speed driving gear 25b, the forward low speed transmission member 71 and the forward low speed clutch 72 of the third embodiment have the same construction as those of the first embodiment. The different point of the forward low speed driven gear 452 from the forward low speed driven gear 52 of the first embodiment is that the forward low speed driven gear 452 is formed on a right side thereof with a transmission gear 452a engaged with the shifter 56.

The gearshift for switching the activated speed gear train of the gear transmission 450 from the forward high speed gear train 450H to the forward low speed gear train 450L when the torque sensor 90 detects an excessive traveling load will be described. The torque sensor 90 of the fourth embodiment has the same construction as that of the first embodiment. When the traveling load applied on the speed-change driven shaft 26 is increased and becomes larger than the first switching point, the downstream detection member 96 is slid leftward on the speed-change driven shaft 26 away from the upstream detection member 91 against the biasing member 94.

As the downstream detection member 96 is slid leftward away from the upstream detection member 91, the clutch slide member 474 axially slidably integrated with the downstream detection member 96 through the bearing 489, the first connection member 487 and the second connection member 488 also slides leftward on the first transmission member 58 away from the forward high speed driven gear 451. When the clutch slide member 474 is slid away from the forward high speed driven gear 451, the clutch-teeth part of the clutch slide member 474 and the clutch-teeth part of the forward high speed driven gear 451 are disengaged from each other, thereby disengaging the forward high speed clutch 473.

When the forward high speed clutch 473 is disengaged, the rotary speed of the forward low speed driving gear 25b is reduced and becomes lower than that of the forward low speed transmission member 71 (the speed-change driving shaft 25) and the sprags of the forward low speed clutch 72 are raised up, thereby engaging the forward low speed clutch 72. Accordingly, the activated speed gear train of the gear transmission 450 is switched from the forward high speed gear train 450H to the forward low speed gear train 450L.

The gearshift of switching the activated speed gear train of the gear transmission 450 from the forward low speed gear train 450L to the forward high speed gear train 450H when the traveling load detected by the torque sensor 90 is reduced will be described. When the traveling load applied on the speed-change driven shaft 26 becomes lower than the second switching point lower than the first switching point, the downstream detection member 96 is slid by the biasing force of the biasing member 94 rightward toward the upstream detection member 91.

As the downstream detection member 96 is slid rightward toward the upstream detection member 91, the clutch slide member 474 axially slidably integrated with the downstream detection member 96 through the bearing 489, the first connection member 487 and the second connection member 488 also slides rightward on the first transmission member 58 toward the forward high speed driven gear 451, and finally, the pawls of the clutch slide member 474 are engaged into the respective recesses of the forward high speed driven gear 451, thereby engaging the forward high speed clutch 473.

When the forward high speed clutch 473 is engaged, the rotary speed of the forward low speed driving gear 25*b* is increased and is relatively higher than that of the forward low speed transmission member 71 (the speed-change driving shaft 25) and the sprags of the forward low speed clutch 72 are laid, thereby disengaging the forward low speed clutch 72. Accordingly, the activated speed gear train of the gear transmission 450 is switched from the forward low speed gear train 450L to the forward high speed gear train 450H.

Due to the above-mentioned construction, as far as the variation of traveling load is within the range between the first and second switching points, the set high or low speed stage is maintained, thereby preventing frequent gearshift between the high speed stage and the low speed stage, and thereby stabilizing the traveling of the vehicle. Namely, the second switching point for switching the activated speed gear train from the forward low speed gear train 450L to the forward high speed gear train 450H is lower than the first switching point for switching the activated speed gear train from the forward high speed gear train 450H to the forward low speed gear train 450L, and the difference of the traveling load between the first and second switching points is hysteresis. Therefore, once the increasing traveling load becomes larger than the first switching point and the forward high speed gear train 450H is switched to the forward low speed gear train 450L, the activation of the low speed gear train 450L is kept while the traveling load is larger than the second switching point which is lower than the first switching point even if the traveling load is reduced.

Further, as mentioned above, the forward high speed clutch 473 is connected mechanically to the downstream detection member 96 of the torque sensor 90, i.e., the mechanical connection construction including the slide member 487 is provided for connecting the torque sensor 90 to the forward high speed clutch 473, so that it is not necessary to provide any additional control means for controlling the forward high speed clutch 473. Further, the forward high speed clutch 473 is provided coaxially to the torque sensor 90 with the mechanical connection construction, thereby ensuring the radial compactness of the gear transmission 450 provided with the torque sensor 90. Further, since the forward high speed clutch 473 is the simple dog clutch controlled according to detection of the load, the mechanical connection construction to connect the forward high speed clutch 473 to the downstream detection member 96 of the torque sensor 90 can be simple.

Figure 19:
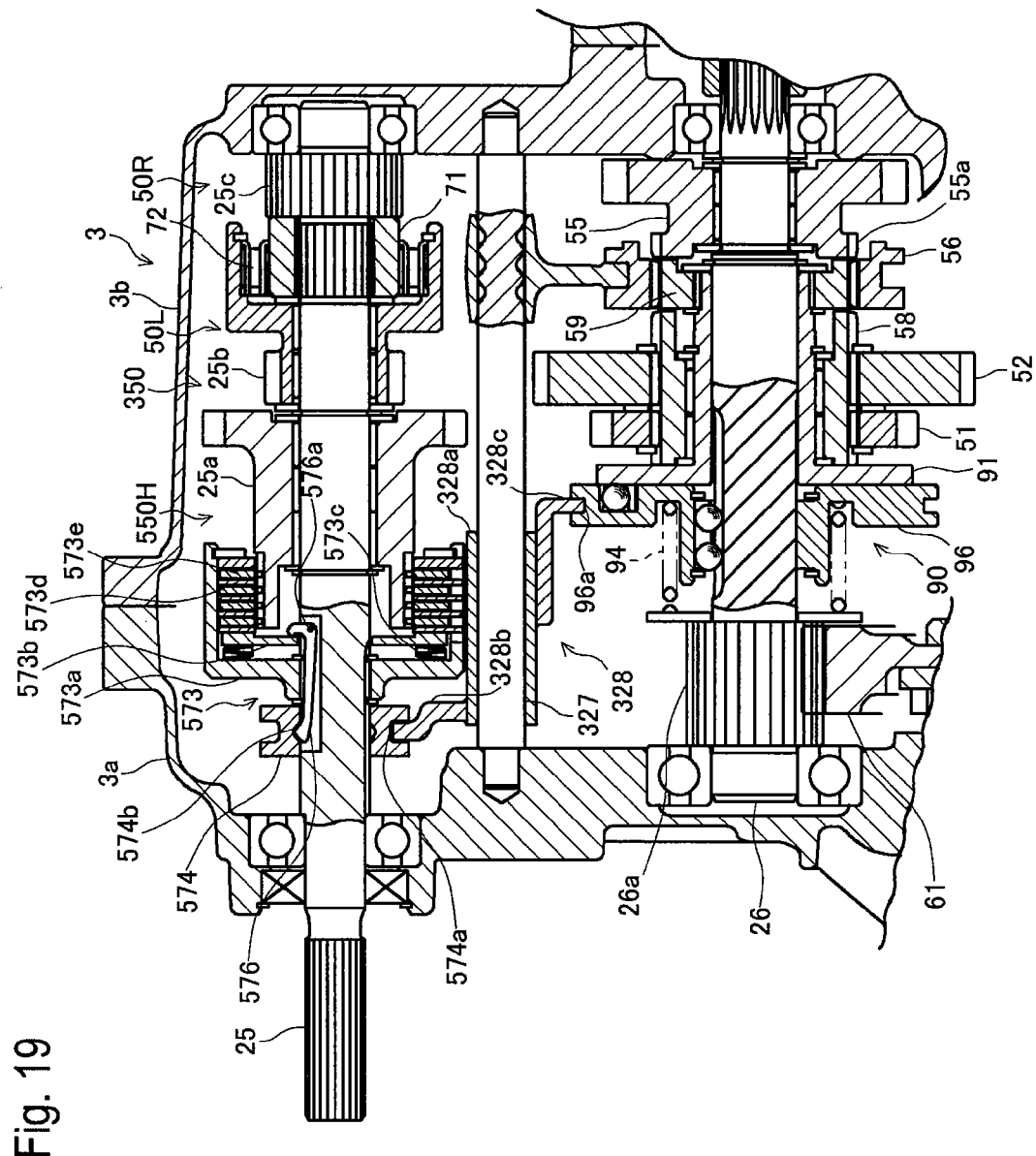
FIG. 19 is a sectional rear view of an axle drive unit of a fifth embodiment.

Next, explanation will be given on an axle drive unit of a fifth embodiment shown in FIG. 19. In the fifth embodiment, a gear transmission 550 includes the torque sensor 90, a forward high speed gear train 550H, the forward low speed gear train 50L and the backward gear train 50R. The forward low speed gear train 50L and the backward gear train 50R of the fifth embodiment have the same construction as those of the first embodiment.

The forward high speed gear train 550H includes the forward high speed driving gear 25*a* relatively rotatably provided on the speed-change driving shaft 25, the forward high speed driven gear 51 relatively unrotatably provided on the first transmission member 58 and meshing with the forward high speed driving gear 25*a*, and a forward high speed clutch 573. The forward high speed clutch 573 is a dog clutch. In detail, the forward high speed clutch 573 is a lever-actuated friction disc clutch, which includes a clutch body 573*a*, a pressure plate 573*b*, a disc spring 573*c*, friction plates 573*d* and 573*e*, a lever 576, and a clutch slide member 574. The forward high speed driving gear 25*a* and the forward high speed driven gear 51 of the fifth embodiment have substantially the same construction as those of the first embodiment.

The clutch body 573*a* is integrally formed with a boss part relatively unrotatably fitted on the speed-change driving shaft 25. A right part of the clutch body 573*a* is expanded radially from the speed-change driving shaft 25 and is axially extended rightward along the speed-change driving shaft 25 so as to form a drum-shaped part. The forward high speed driving gear 25*a* is extended leftward and is inserted into the drum-shaped part of the clutch body 573*a*. The friction plates 573*d* and the friction plates 573*e* are alternately aligned in a space between the drum-shaped part of the clutch body 573*a* and the leftward extended part of the forward high speed driving gear 25*a*. The friction plates 573*d* are axially (laterally) slidably and relatively unrotatably fitted to the drum-like part of the clutch body 573*a*, and the friction plates 573*e* are axially (laterally) slidably and relatively unrotatably fitted to the leftward extended part of the forward high speed driving gear 25*a*. The pressure plate 573*b* is axially (laterally) slidably fitted on the speed-change driving shaft 25 in the clutch body 573*a*. The disc spring 573*c* is interposed between the pressure plate 573*b* and the clutch body 573*a* so as to bias the pressure plate 573*b* toward the friction plates 573*d* and 573*e*.

The lever 576 is pivoted on the speed-change driving shaft 25 through a pivot member 576*a* so as to be rotatable along the axial direction of the speed-change driving shaft 25 (the lateral direction). The L-shaped lever 576 includes a long part axially (laterally) extended along the speed-change driving shaft 25, and includes a short part extended radially of the speed-change driving shaft 25. The pivot member 576*a* is provided on a joining part of the long and short parts of the lever 576. The short part of the lever 576 is engaged at a tip thereof with the pressure plate 573*b*, and the long part of the lever 576 is engaged at a tip thereof with the clutch slide member 574.

The cylindrical clutch slide member 574 is axially (laterally) slidably fitted on the speed-change driving shaft 25. The tip of the long part of the lever 576 is engaged into a recess 574*b* formed on an inner peripheral surface of the clutch slide member 574 facing the speed-change driving shaft 25. An annular groove 574*a* is formed on the clutch slide member 574. The guide member 328 is axially slidably fitted on the guide shaft 327, the second engagement part 328*c* of the guide member 328 is engaged into the annular groove 96*a* of the downstream detection member 96, and the first engagement part 328*b* of the guide member 328 is engaged into the groove 574*a*, so that, as the downstream detection member 96 axially slides on the speed-change driven shaft 26, the clutch slide member 574 axially slidably integrated with the downstream detection member 96 through the guide member 328 also axially slides on the speed-change driving shaft 25.

The gearshift of switching the activated speed gear train of the gear transmission 550 from the forward high speed gear train 550H to the forward low speed gear train 50L when the torque sensor 90 detects an excessive traveling load will be described. The torque sensor 90 of the fifth embodiment has the same construction as that of the first embodiment. When the traveling load applied on the speed-change driven shaft 26 is increased and becomes larger than the first switching point, the downstream detection member 96 is slid leftward on the speed-change driven shaft 26 against the biasing member 94 away from the upstream detection member 91.

As the downstream detection member 96 is slid leftward away from the upstream detection member 91, the clutch slide member 574 axially slidably integrated with the downstream detection member 96 through the guide member 328 also axially slides leftward on the speed-change driving shaft 25 away from the forward high speed driving gear 25*a*, thereby disengaging the forward high speed clutch 573. In detail, as the clutch slide member 574 is slid leftward away from the forward high speed driving gear 25*a*, the recess 574*a* of the clutch slide member 574 also moves leftward together with the tip of the long part of the lever 576 engaged into the recess 574*a*, so that the tip of the short part of the lever 576 engaged with the pressure plate 573*b* is rotated leftward centered on the pivot member 576*a* and pushes the pressure plate 573*b* leftward away from the friction plates 573*d* and 573*e* against the disc spring 573*c* so as to separate the friction plates 573*d* and 573*e* from one another, thereby disengaging the forward high speed clutch 573.

When the forward high speed clutch 573 is disengaged, the rotary speed of the forward low speed driving gear 25*b* is reduced and becomes lower than that of the forward low speed transmission member 71 (the speed-change driving shaft 25) and the sprags of the forward low speed clutch 72 are raised up, thereby engaging the forward low speed clutch 72. Accordingly, the activated speed gear train of the gear transmission 550 is switched from the forward high speed gear train 550H to the forward low speed gear train 50L.

The gearshift of switching the activated speed gear train of the gear transmission 550 from the forward low speed gear train 50L to the forward high speed gear train 550H when the traveling load detected by the torque sensor 90 is reduced will be described. When the traveling load applied on the speed-change driven shaft 26 becomes lower than the second switching point lower than the first switching point, the downstream detection member 96 is slid rightward on the speed-change driven shaft 26 by the biasing force of the biasing member 94 toward the upstream detection member 91.

As the downstream detection member 96 is slid rightward toward the upstream detection member 91, the clutch slide member 574 axially slidably integrated with the downstream detection member 96 through the guide member 328 also slides rightward on the speed-change driving shaft 25 toward the forward high speed driving gear 25*a*, thereby engaging the forward high speed clutch 573. In detail, as the clutch slide member 574 is slid rightward toward the forward high speed driving gear 25*a*, the recess 574*b* of the clutch slide member 574 also moves rightward together with the tip of the long part of the lever 576 engaged into the recess 574*b*, so that the tip of the short part of the lever 576 engaged with the pressure plate 573*b* moves rightward so as to allow the pressure plate 573*b* to move rightward by the biasing force of the disc spring 573*c*, thereby pressing the friction plates 573*d* and 573*e* against one another, i.e., engaging the forward high speed clutch 573.

When the forward high speed clutch 573 is engaged, the rotary speed of the forward low speed driving gear 25*b* is increased and is relatively higher than that of the forward low speed transmission member 71 (the speed-change driving shaft 25) and the sprags of the forward low speed clutch 72 are laid, thereby disengaging the forward low speed clutch 72. Accordingly, the activated speed gear train of the gear transmission 550 is switched from the forward low speed gear train 50L to the forward high speed gear train 550H.

Due to the above-mentioned construction, as far as the variation of traveling load is within the range between the first and second switching points, the set high or low speed stage is maintained, thereby preventing frequent gearshift between the high speed stage and the low speed stage, and thereby stabilizing the traveling of the vehicle. Namely, the second switching point for switching the activated speed gear train from the forward low speed gear train 50L to the forward high speed gear train 550H is lower than the first switching point for switching the activated speed gear train from the forward high speed gear train 550H to the forward low speed gear train 50L, and the difference of the traveling load between the first and second switching points is hysteresis. Therefore, once the increasing traveling load becomes larger than the first switching point and the activated speed gear train is switched from the forward high speed gear train 550H to the forward low speed gear train 50L, the activation of the low speed gear train 50L is kept while the traveling load is larger than the second switching point which is lower than the first switching point even if the traveling load is reduced.

Further, as mentioned above, the forward high speed clutch 573 is connected mechanically to the downstream detection member 96 of the torque sensor 90, i.e., the mechanical connection construction including the guide member 328 is provided for connecting the torque sensor 90 to the forward high speed clutch 573, so that it is not necessary to provide any additional control means for controlling the forward high speed clutch 573.

Further, the forward high speed clutch 573 is provided on the speed-change driving shaft 25, and the torque sensor 90 is provided on the speed-change driven shaft 26 disposed in parallel to the speed-change driving shaft 25, i.e., the forward high speed clutch 573 and the torque sensor 90 are disposed non-coaxially to each other, thereby axially minimizing the gear transmission 550.

Further, the actuator for operating the forward high speed clutch 573 is the mechanical lever 576, thereby needing neither hydraulic pressure nor an electric switch.

Figure 22:
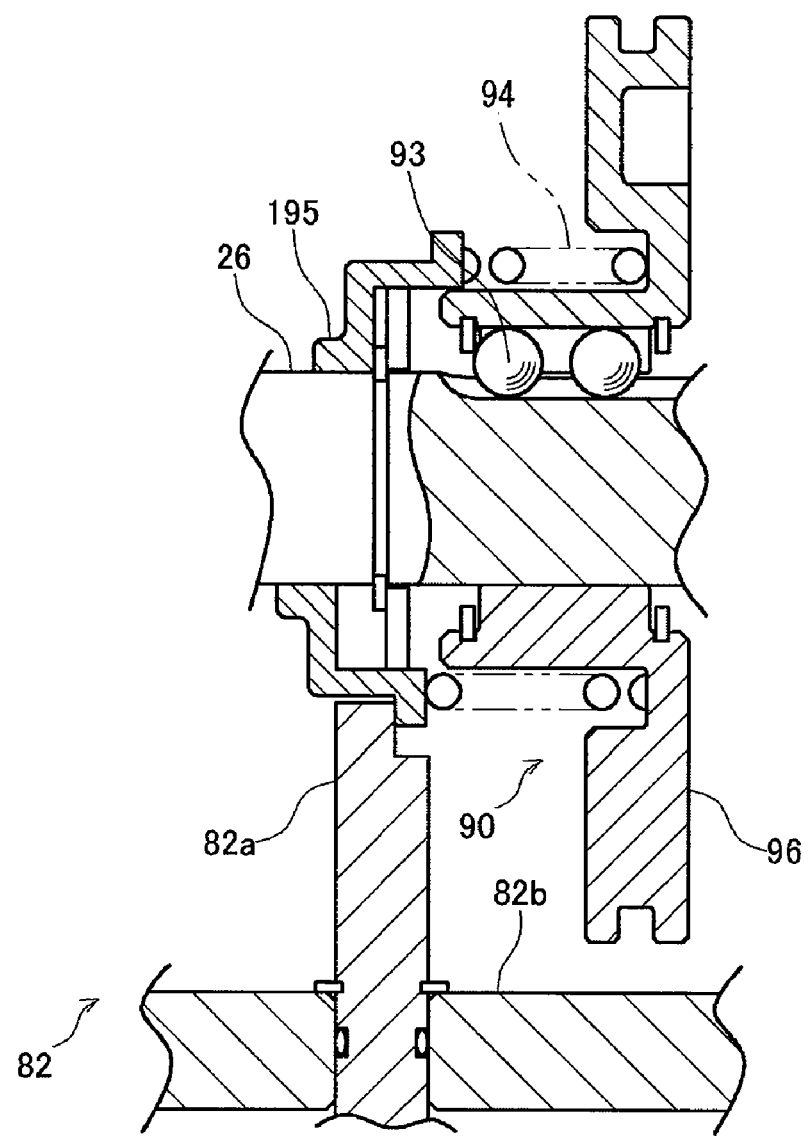
FIG. 22 is a sectional rear view of a biasing force regulation mechanism of the torque sensor.

Next, explanation will be given on a biasing force regulation mechanism 82 for regulating the biasing force of the biasing member (spring) 94 the torque sensor 90 shown in FIG. 22. The biasing force regulation mechanism 82 shown in FIG. 22 is a representative mechanism adapted to the torque sensor 90 of the axle drive unit of the first embodiment. However, this mechanism may be adapted to any of the torque sensors 90 of the axle drive units of other embodiments. The biasing force regulation mechanism 82 includes a spring-retaining slider 195, a first operation member 82*a* and a second operation member 82*b*. The spring-retaining slider 195 is axially slidably fitted on the speed-change driven shaft 26. The first operation member 82*a* is fixed to the second operation member 82*b* so as to be pressed against the spring-retaining slider 195 against the biasing member 94. The first operation member 82*a* is movable integrally with the second operation member 82*b* so as to be able to axially (laterally) move the spring-retaining slider 195 along the speed-change driven shaft 26. For example, the first operation member 82*a* is a camshaft whose cam portion is pressed against the spring-retaining slider 195 against the biasing force of the biasing member 94, and the second operation member 82*b* is movable so that the first operation member 82*a* is rotated centered on the axis thereof according to the movement of the second operation member 82*b*, thereby moving the cam portion of the first operation member 82*a* pressed against the spring-retaining slider 195. Alternatively, the second operation member 82*b* may be an axially slidable shaft so that the first operation member 82*a* slides in the axial direction of the speed-change driven shaft 26 according to the axial slide of the second operation member 82*b*.

Figure 23:
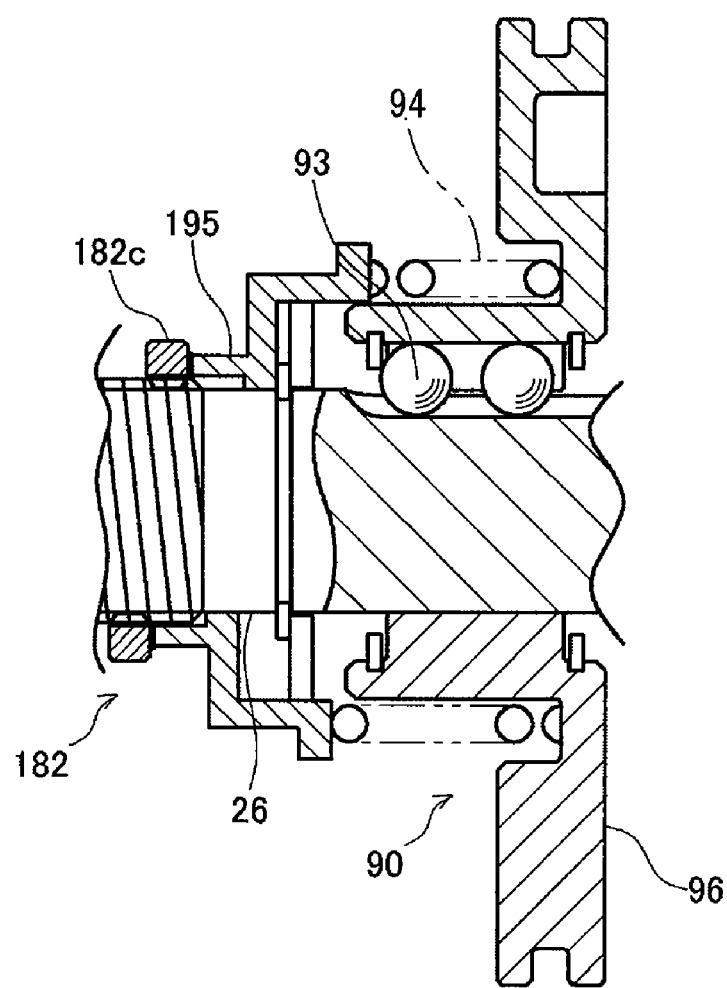
FIG. 23 is a sectional rear view of another biasing force regulation mechanism of the torque sensor.

In FIG. 22 and later-discussed FIG. 23, for convenience in drawing, the axial (lateral) position of the upper portion of the spring-retaining slider 195 shown above the speed-change driven shaft 26 is different from the axial (lateral) position of the lower portion of the spring-retaining slider 195 shown below the speed-change driven shaft 26. Due to the operation of the operation members 82*a* and 82*b*, the spring-retaining slider 195 may be located at a position as shown above the speed-change driven shaft 26 in FIG. 22 so as to move the spring-retaining slider 195 toward the downstream detection member 96, thereby increasing the biasing force of the biasing member 94, or the spring-retaining slider 195 may be located at another position as shown below the speed-change driven shaft 26 in FIG. 22 so as to move the spring-retaining slider 195 away from the downstream detection member 96, thereby reducing the biasing force of the biasing member 94.

An alternative biasing force regulation mechanism 182 adaptable to the torque sensor 90 will be described with reference to FIG. 23. The biasing force regulation mechanism 182 includes the spring-retaining slider 195 and a nut 182*c*. The spring-retaining slider 195 is axially (laterally) slidably fitted on the speed-change driven shaft 26. The nut 182*c* is screwed onto the speed-change driven shaft 26 and is pressed against the spring-retaining slider 195 against the biasing force of the biasing member 94. By rotating the nut 182*c* to change the axial position of the nut 182*c* along the speed-change driven shaft 26, the spring-retaining slider 195 also axially slides on the speed-change driven shaft 26 so as to change the biasing force of the biasing member 94.

Due to the optional operation of the above-mentioned biasing force regulation mechanism 82 or 182, the biasing force of the biasing member 94 interposed between the spring-retaining slider 195 and the downstream detection member 96 can be adjusted so as to determine the threshold traveling load detected by the torque sensor 90 for switching the activated speed gear train of each of the above-mentioned gear transmissions between the forward high speed gear train and the forward low speed gear train.

What is claimed is:

1. A gear transmission for driving an axle of a vehicle comprising:
   an input shaft;
   an output shaft for driving the axle;
   a high speed clutch;
   a high speed gear train interposed through the high speed clutch between the input shaft and the output shaft;
   a low speed clutch;
   a low speed gear train interposed through the low speed clutch between the input shaft and the output shaft; and
   a traveling load detection means which detects a traveling load that is a load applied on the output shaft during traveling of the vehicle, the traveling load detection means including
   an upstream detection member provided relatively rotatably on the output shaft so as to be drivingly connected to the input shaft through either the high speed gear train or the low speed gear train and either the correspondingly engaged high speed clutch or low speed clutch,
   a downstream detection member provided relatively unrotatably on the output shaft,
   wherein one of the upstream and downstream detection members is an axially slidable detection member which is axially slidable along the output shaft, and
   a biasing member biasing the upstream detection member and the downstream detection member toward each other,
   wherein one of the upstream and downstream detection members has a first engagement part and a second engagement part,
   wherein, when the axially slidable detection member slides in the biasing direction of the biasing member, the first engagement part is engaged with the other of the upstream and downstream detection members,
   wherein, when the axially slidable detection member slides opposite to the biasing direction of the biasing member, the second engagement part is engaged with the other of the upstream and downstream detection members,
   wherein the first engagement part and the second engagement part generate respective forces for sliding the axially slidable detection member opposite to the biasing direction of the biasing member,
   wherein the forces are changed according to variation of the traveling load,
   wherein, when the traveling load is increased and becomes larger than a first switching point, the axially slidable detection member slides away from the other upstream or downstream detection member opposite to the biasing direction of the biasing member, so that the high speed clutch is disengaged and the low speed clutch is engaged, and
   wherein, when the traveling load is reduced and becomes smaller than a second switching point which is smaller than the first switching point, the axially slidable detection member slides toward the other upstream or downstream detection member in the biasing direction of the biasing member, so that the high speed clutch is engaged and the low speed clutch is disengaged.

2. The gear transmission as set forth in claim 1, wherein an actuator for switching the high speed clutch is electrically controlled, and is provided with an electric switch which is turned on and off due to the slide of the axially slidable detection member.

3. The gear transmission as set forth in claim 2, wherein the high speed clutch is a hydraulic clutch.

4. The gear transmission as set forth in claim 1, wherein the high speed clutch is mechanically connected to the axially slidable detection member.

5. The gear transmission as set forth in claim 4, wherein the high speed clutch is provided coaxially to the traveling load detection means.

6. The gear transmission as set forth in claim 4, wherein the high speed clutch is provided non-coaxially to the traveling load detection means.

7. The gear transmission as set forth in claim 4, wherein the high speed clutch is a dog clutch.

8. The gear transmission as set forth in claim 4, wherein the high speed clutch is a lever-actuated friction plate clutch.

9. The gear transmission as set forth in one of claims 1, wherein the low speed clutch is an overrunning clutch.

10. The gear transmission as set forth in one of claims 1, wherein each of the upstream and downstream detection members is provided with the first engagement part and the second engagement part, wherein the first and second engagements parts are surfaces continuous to each other, and wherein an angle of the first engagement part about the axis of the output shaft is different from an angle of the second engagement part about the axis of the output shaft.

11. The gear transmission as set forth in one of claims 1, wherein the upstream detection member and the downstream detection member are engaged with each other through an intermediate member.

12. The gear transmission as set forth in claim 11, wherein the intermediate member is shaped in a ball.

13. The gear transmission as set forth in claim 11, wherein the downstream detection member serves as the axially slidable detection member, wherein the intermediate member is rotatably and slidably integral with the axially slidable downstream detection member, wherein the upstream detection member serves as a low speed gear constituting the low speed gear train, and wherein the low speed gear is formed with the first engagement part and the second engagement part.

14. The gear transmission as set forth in claim 13, wherein a high speed gear constituting the high speed gear train is disposed on the output shaft opposite to the axially slidable downstream detection member about the low speed gear, wherein the high speed clutch includes an engagement member provided in the axially slidable downstream detection member, and wherein the engagement member slidably penetrates the low speed gear so as to be selectively engaged or disengaged with and from the high speed gear.

15. The gear transmission as set forth in claim 1, wherein the gear transmission is a sub transmission disposed on the downstream of a main transmission so that the main transmission drives the input shaft of the gear transmission.

* * * * *